United States Patent
Li et al.

(10) Patent No.: US 11,581,939 B2
(45) Date of Patent: Feb. 14, 2023

(54) METHOD AND APPARATUS FOR TRANSMISSION AND RECEPTION IN BACKHAUL LINK IN A WIRELESS COMMUNICATION SYSTEM

(71) Applicant: ASUSTek Computer Inc., Taipei (TW)

(72) Inventors: Ming-Che Li, Taipei (TW); Yu-Hsuan Guo, Taipei (TW); Meng-Hui Ou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/227,621

(22) Filed: Dec. 20, 2018

(65) Prior Publication Data
US 2019/0199424 A1    Jun. 27, 2019

Related U.S. Application Data

(60) Provisional application No. 62/609,191, filed on Dec. 21, 2017.

(51) Int. Cl.
| | | |
|---|---|---|
| *H04B 7/14* | (2006.01) | |
| *H04L 43/0864* | (2022.01) | |
| *H04L 27/26* | (2006.01) | |
| *H04W 56/00* | (2009.01) | |
| *H04L 43/0852* | (2022.01) | |

(52) U.S. Cl.
CPC ........... *H04B 7/14* (2013.01); *H04L 27/2605* (2013.01); *H04L 43/0852* (2013.01); *H04L 43/0864* (2013.01); *H04W 56/001* (2013.01); *H04W 56/0045* (2013.01)

(58) Field of Classification Search
None
See application file for complete search history.

(56) References Cited

U.S. PATENT DOCUMENTS

| | | | | |
|---|---|---|---|---|
| 5,541,979 A | * | 7/1996 | Leslie | .............. H04J 3/0682 |
| | | | | 455/434 |
| 8,594,562 B2 | | 11/2013 | Charbit | |
| RE47,721 E | * | 11/2019 | Futaki | .............. H04W 56/0055 |
| 2004/0242251 A1 | * | 12/2004 | Hagiwara | ......... H04W 56/0075 |
| | | | | 455/502 |
| 2007/0155315 A1 | | 7/2007 | Lee | |
| 2009/0190510 A1 | * | 7/2009 | Kobayashi | .......... H04L 27/2678 |
| | | | | 370/280 |

(Continued)

FOREIGN PATENT DOCUMENTS

| | | |
|---|---|---|
| EP | 2523489 | 11/2012 |
| EP | 2568755 | 3/2013 |

(Continued)

OTHER PUBLICATIONS

European Search Report from corresponding EP Application No. 18214435.2, dated Aug. 6, 2019.

*Primary Examiner* — Alpus Hsu
*Assistant Examiner* — Camquyen Thai
(74) *Attorney, Agent, or Firm* — Cooper Legal Group LLC

(57) ABSTRACT

A method and apparatus are disclosed from the perspective of a first network node served by a second network node. In one embodiment, the method includes the first network node performs a transmission to the second network node with a timing advance, wherein the timing advance is set to transmission delay between the first network node and the second network node or is set to the transmission delay with a timing reduction.

28 Claims, 32 Drawing Sheets

(56) References Cited

U.S. PATENT DOCUMENTS

| | | | |
|---|---|---|---|
| 2009/0247087 A1* | 10/2009 | Chin | H04W 56/009 455/67.14 |
| 2010/0226296 A1* | 9/2010 | Wala | H04B 7/2656 370/294 |
| 2010/0297948 A1* | 11/2010 | Rinne | H04L 27/2601 455/63.1 |
| 2011/0170475 A1* | 7/2011 | Raaf | H04L 5/1469 370/315 |
| 2012/0044857 A1* | 2/2012 | Kim | H04B 7/2606 370/315 |
| 2012/0269113 A1* | 10/2012 | Park | H04B 7/2656 370/315 |
| 2013/0034037 A1* | 2/2013 | Krone | H04W 56/004 370/312 |
| 2014/0010143 A1* | 1/2014 | Barrett | H04W 72/005 370/312 |
| 2014/0029508 A1* | 1/2014 | Kim | H04B 7/15507 370/315 |
| 2014/0120947 A1* | 5/2014 | Siomina | H04W 4/50 455/456.1 |
| 2014/0254415 A1* | 9/2014 | Chen | H04L 27/0006 370/252 |
| 2015/0049774 A1* | 2/2015 | Kim | H04L 47/11 370/503 |
| 2015/0056992 A1* | 2/2015 | Morita | H04W 72/005 455/435.1 |
| 2016/0174177 A1* | 6/2016 | Frederiksen | H04W 56/0045 370/329 |
| 2016/0337999 A1* | 11/2016 | Lee | H04W 74/0833 |
| 2017/0150523 A1* | 5/2017 | Patel | H04W 48/10 |
| 2017/0195920 A1* | 7/2017 | Fan | H04W 16/10 |
| 2017/0302359 A1* | 10/2017 | Guo | H04B 7/155 |
| 2018/0110058 A1* | 4/2018 | Hessler | H04L 1/0027 |
| 2018/0139025 A1* | 5/2018 | Rico Alvarino | H04W 56/0055 |
| 2020/0120458 A1* | 4/2020 | Aldana | H04W 28/22 |

FOREIGN PATENT DOCUMENTS

| | | |
|---|---|---|
| WO | 95024783 | 9/1995 |
| WO | 2008045639 | 4/2008 |
| WO | 20120126828 | 9/2012 |
| WO | 20150119546 | 8/2015 |

* cited by examiner (a) Digital beamforming (b) Analogue beamforming

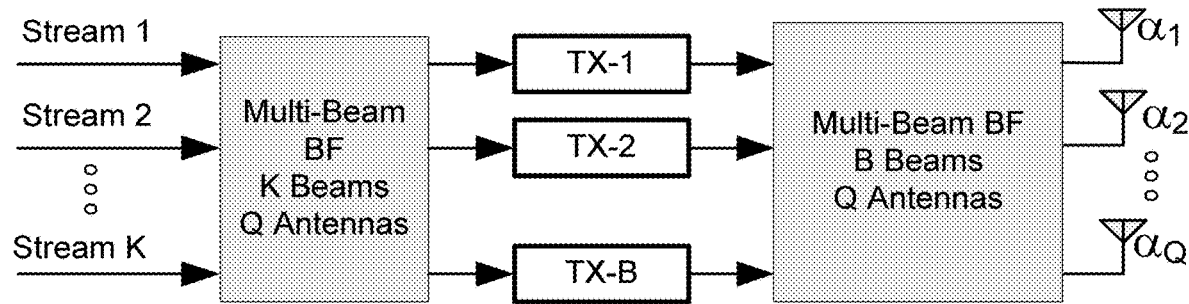
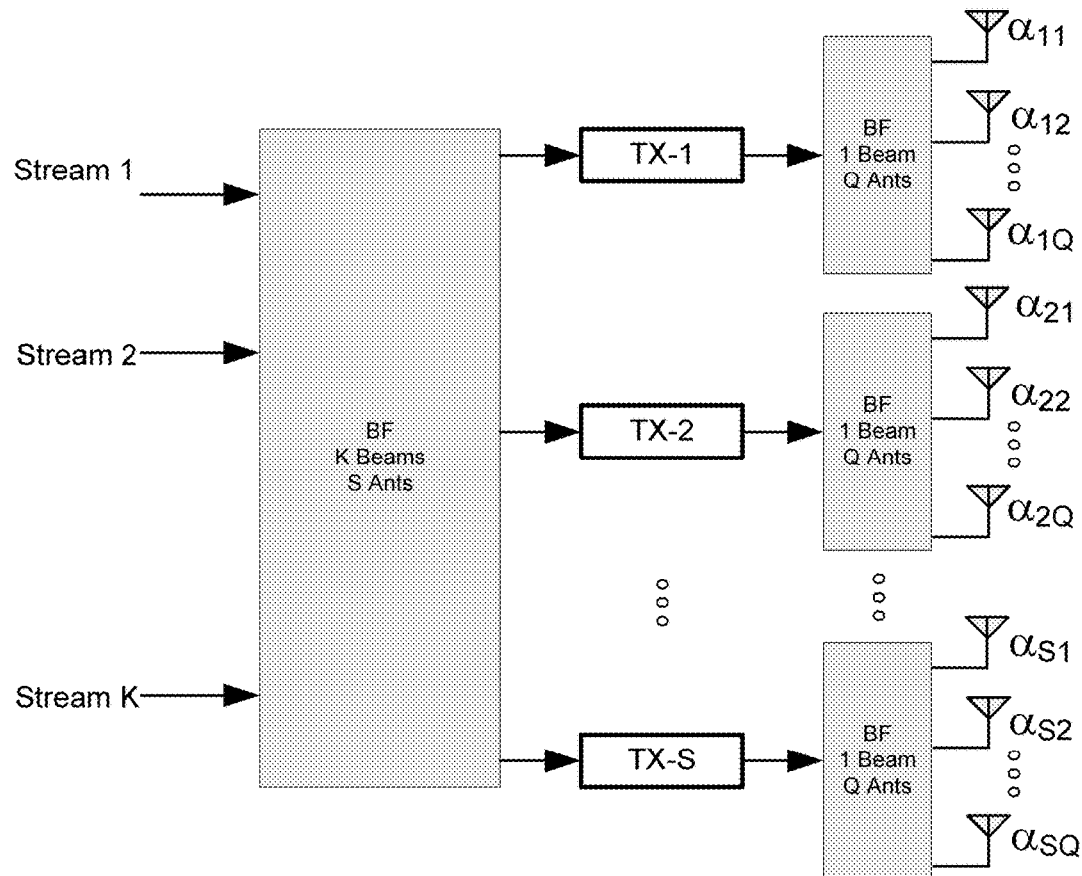
(c) Hybrid beamforming: Left = fully connected, Right = sub-array
FIG. 5C

| Property | Definition |
|---|---|
| Relay definition | The relay node is wirelessly connected to the radio-access network via a donor cell. |
| Usage of spectrum | 1. inband, in which case the eNB -relay link shares the same carrier frequency with relay-UE links.<br>2. outband, in which case the eNB-relay link does not operate in the same carrier frequency as relay-UE links. E.g. Type 1a Relay |
| Duplexing scheme | 1. FDD, in which the eNB-relay link operates in paired spectrum<br>2. TDD, in which the eNB-relay link operates in unpaired spectrum |
| Knowledge in the UE | 1. transparent, in which case the UE is not aware of whether or not it communicates with the network via the relay.<br>2. non-transparent, in which case the UE is aware of whether or not it is communicating with the network via the relay. |
| Relaying strategy | 1. A relay may be part of the donor cell, e.g. Type 2 Relay.<br>2. A relay may control cells of its own, e.g. Type 1 Relay. |

FIG. 17 (PRIOR ART)

| SubframeConfigurationTDD | eNB-RN uplink-downlink configuration | Subframe number n | | | | | | | | | |
|---|---|---|---|---|---|---|---|---|---|---|---|
| | | 0 | 1 | 2 | 3 | 4 | 5 | 6 | 7 | 8 | 9 |
| 0 | 1 | | | | | D | | | | U | |
| 1 | | | | | U | | | | | | D |
| 2 | | | | | | D | | | | U | D |
| 3 | | | | | U | D | | | | | D |
| 4 | | | | | U | D | | | | U | D |
| 5 | 2 | | | U | | | | | | D | |
| 6 | | | | | D | | | | U | | |
| 7 | | | | U | | D | | | | D | |
| 8 | | | | | D | | | | U | | D |
| 9 | | | | U | D | D | | | | D | |
| 10 | | | | | | D | | | U | D | D |
| 11 | 3 | | | | U | | | | D | | D |
| 12 | | | | | U | | | | D | D | D |
| 13 | 4 | | | | U | | | | | | D |
| 14 | | | | | U | | | | D | | D |
| 15 | | | | | U | | | | | D | D |
| 16 | | | | | U | | | | D | D | D |
| 17 | | | | | U | D | | | D | D | D |
| 18 | 6 | | | | | U | | | | | D |

FIG. 18 (PRIOR ART)

(normal cyclic prefix, $\Delta f = 15\,kHz$)

| Configuration | DL-StartSymbol | End symbol index |
|---|---|---|
| 0 | 1 | 6 |
| 1 | 2 | 6 |
| 2 | 3 | 6 |

FIG. 19A (PRIOR ART)

(normal cyclic prefix, $\Delta f = 15\,kHz$)

| Configuration | Start symbol index | End symbol index |
|---|---|---|
| 0 | 0 | 6 |
| 1 | 0 | 5 |

METHOD AND APPARATUS FOR TRANSMISSION AND RECEPTION IN BACKHAUL LINK IN A WIRELESS COMMUNICATION SYSTEM

CROSS-REFERENCE TO RELATED APPLICATIONS

The present Application claims the benefit of U.S. Provisional Patent Application Ser. No. 62/609,191 filed on Dec. 21, 2017, the entire disclosure of which is incorporated herein in its entirety by reference.

FIELD

This disclosure generally relates to wireless communication networks, and more particularly, to a method and apparatus for transmission and reception in backhaul link in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a first network node served by a second network node. In one embodiment, the method includes the first network node performs a transmission to the second network node with a timing advance, wherein the timing advance is set to transmission delay between the first network node and the second network node or is set to the transmission delay with a timing reduction.

BRIEF DESCRIPTION OF THE DRAWINGS

FIGS. 5A-5C provide exemplary illustrations of three types of beamforming.

FIG. 17 is a table according to one exemplary embodiment.

FIG. 18 is a table according to one exemplary embodiment.

FIGS. 19A-B are tables according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: R2-162366, "Beam Forming Impacts", Nokia, Alcatel-Lucent; R2-163716, "Discussion on terminology of beamforming based high frequency NR", Samsung; R2-162709, "Beam support in NR", Intel; R2-162762, "Active Mode Mobility in NR: SINR drops in higher frequencies", Ericsson; R3-160947, TR 38.801 V0.1.0, "Study on New Radio Access Technology; Radio Access Architecture and Interfaces"; R2-164306, "Summary of email discussion [93bis#23][NR] Deployment scenarios", NTT DOCOMO; 3GPP RAN2#94 meeting minute; TS 5G.213 V1.9, "KT 5G Physical layer procedures (Release 1)"; TS 5G.321 V1.2, "KT 5G MAC protocol specification (Release 1)"; TS 5G.211 V2.6, "KT 5G Physical channels and modulation (Release 1)"; TS 5G.331 V1.0, "KT 5G Radio Resource Control (RRC) Protocol specification (Release 1)"; R2-162251, "RAN2 aspects of high frequency New RAT", Samsung; R2-163879, "RAN2 Impacts in HF-NR", MediaTeK; R2-162210, "Beam level management <-> Cell level mobility", Samsung; R2-163471, "Cell concept in NR", CATT; TS 36.300, V14.4.0, "E-UTRA and E-UTRAN; Overall description; Stage2"; LTE-Advanced Relay dated Oct. 18, 2011; TS 36.814 V9.2.0, "E-UTRA; Further advancements for E-UTRA physical layer aspects"; TS 36.216 V14.0.0, "E-UTRA; Physical layer for relaying operation"; R1-102421, "Consideration on DL backhaul channel design", LGE; RP-171880, "Study on Integrated Access and Backhaul for NR"; Final Report of 3GPP TSG RAN WG1 #85 v1.0.0 (Nanjing, China, 23-27 May 2016); and Final Report of 3GPP TSG RAN WG1 #86bis v1.0.0 (Lisbon, Portugal, 10-14 Oct. 2016). The standards and documents listed above are hereby expressly incorporated by reference in their entirety.

Figure 1:
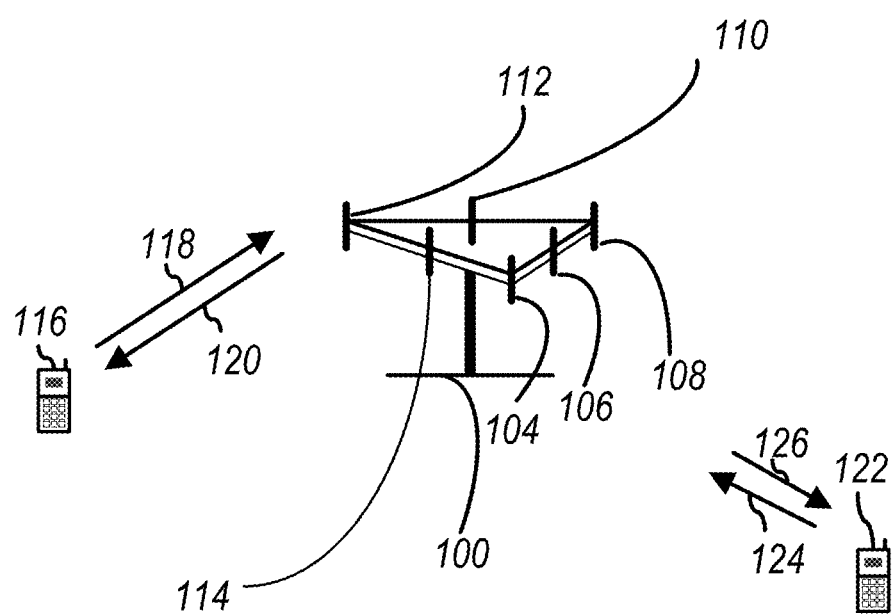
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
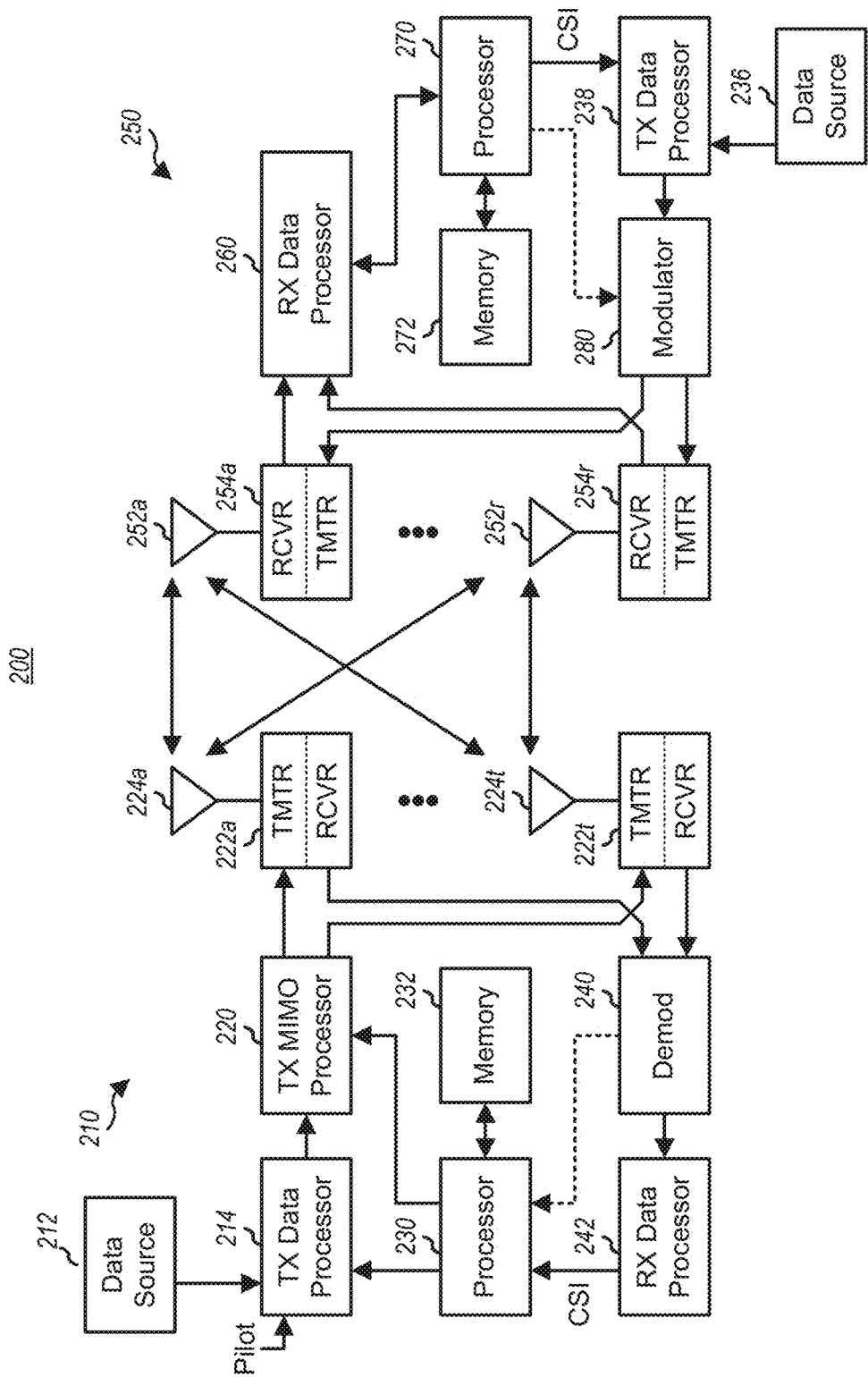
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
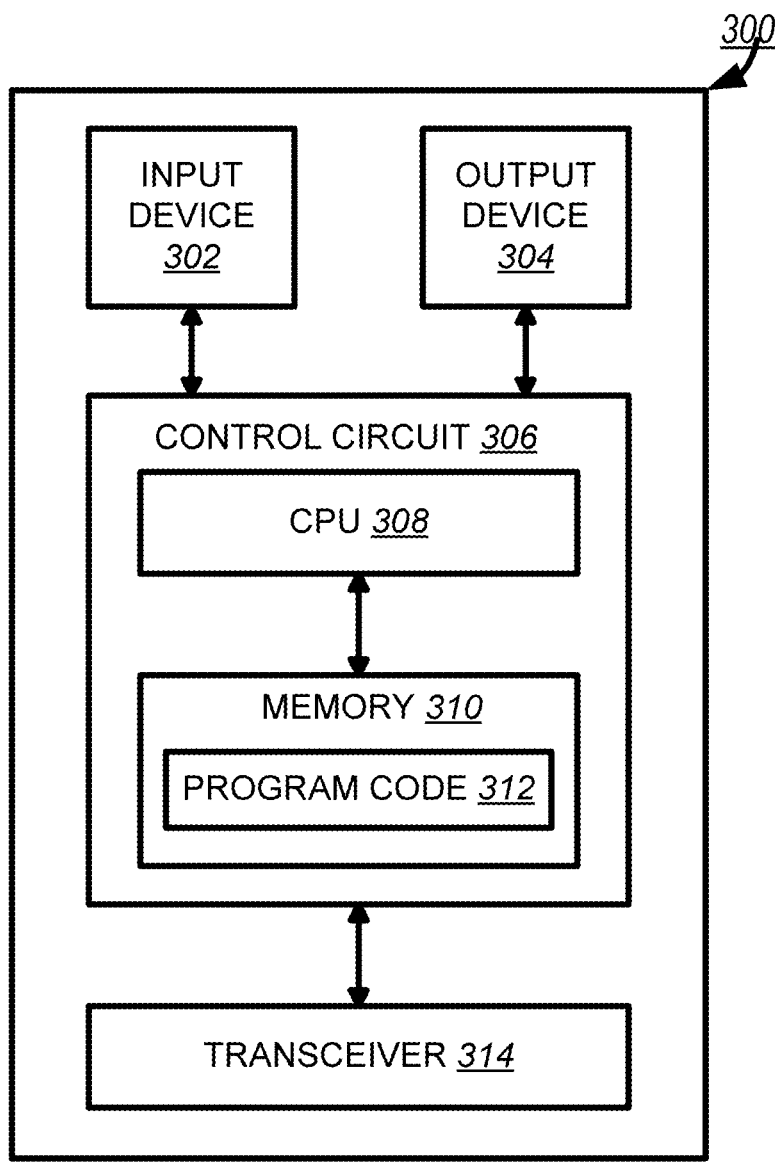
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
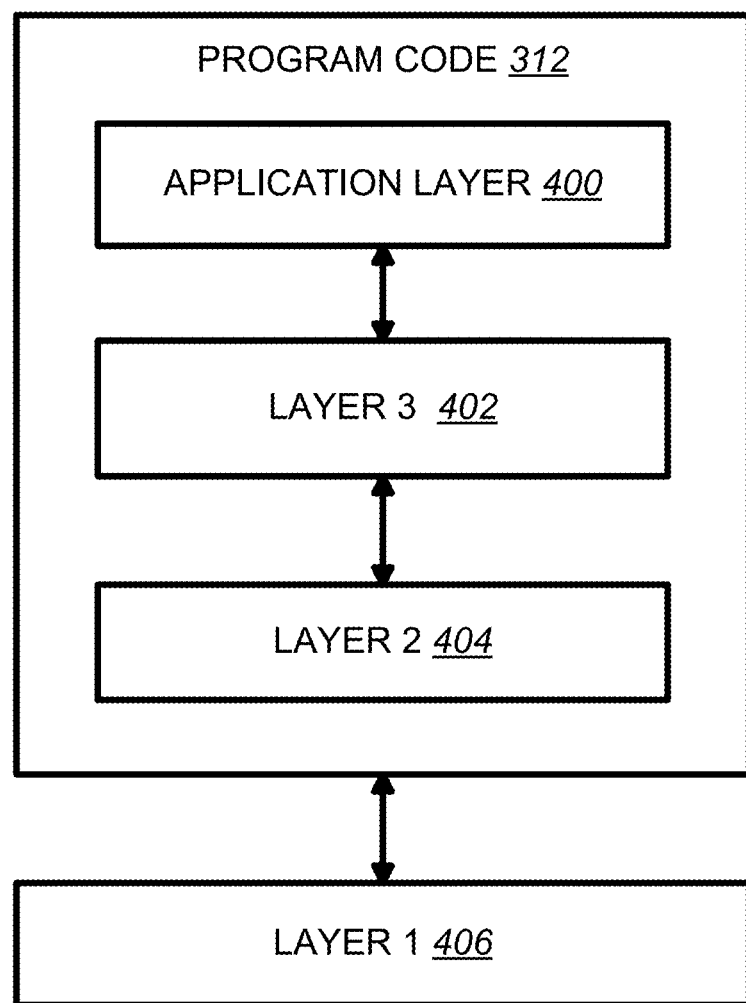
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP standardization activities on next generation (i.e. 5G) access technology have been launched since March 2015. In general, the next generation access technology aims to support the following three families of usage scenarios for satisfying both the urgent market needs and the more long-term requirements set forth by the ITU-R IMT-2020:
 eMBB (enhanced Mobile Broadband)
 mMTC (massive Machine Type Communications)
 URLLC (Ultra-Reliable and Low Latency Communications).

An objective of the 5G study item on new radio access technology is to identify and develop technology components needed for new radio systems which should be able to use any spectrum band ranging at least up to 100 GHz. Supporting carrier frequencies up to 100 GHz brings a number of challenges in the area of radio propagation. As the carrier frequency increases, the path loss also increases.

Based on 3GPP R2-162366, in lower frequency bands (e.g., current LTE bands <6 GHz) the required cell coverage may be provided by forming a wide sector beam for transmitting downlink common channels. However, utilizing wide sector beam on higher frequencies (>>6 GHz) the cell coverage is reduced with same antenna gain. Thus, in order to provide required cell coverage on higher frequency bands, higher antenna gain is needed to compensate the increased path loss. To increase the antenna gain over a wide sector beam, larger antenna arrays (number of antenna elements ranging from tens to hundreds) are used to form high gain beams.

As a consequence the high gain beams being narrow compared to a wide sector beam, multiple beams for transmitting downlink common channels are needed to cover the required cell area. The number of concurrent high gain beams that access point is able to form may be limited by the cost and complexity of the utilized transceiver architecture. In practice, in higher frequencies, the number of concurrent high gain beams is much less than the total number of beams required to cover the cell area. In other words, the access point is able to cover only part of the cell area by using a subset of beams at any given time.

Based on 3GPP R2-163716, beamforming is a signal processing technique used in antenna arrays for directional signal transmission/reception. With beamforming, a beam can be formed by combining elements in a phased array of antennas in such a way that signals at particular angles experience constructive interference while others experience destructive interference. Different beams can be utilized simultaneously using multiple arrays of antennas.

Beamforming can be generally categorized into three types of implementation: digital beamforming, hybrid beamforming, and analog beamforming. For digital beamforming, the beam is generated on the digital domain, i.e. the weighting of each antenna element can be controlled by baseband (e.g. connected to a TXRU (Transceiver Units)). Therefore it is very easy to tune the beam direction of each subband differently across the system bandwidth. Also, to change beam direction from time to time does not require any switching time between OFDM (Orthogonal Frequency Division Multiplexing) symbols. All beams whose directions cover the whole coverage can be generated simultaneously. However, this structure requires (almost) one-to-one mapping between TXRU (transceiver/RF chain) and antenna element and is quite complicated as the number of antenna element increases and system bandwidth increases (also heat problem exists).

For Analog beamforming, the beam is generated on the analog domain, i.e. the weighting of each antenna element can be controlled by an amplitude/phase shifter in the RF (Radio Frequency) circuit. Since the weighing is purely controlled by the circuit, the same beam direction would apply on the whole system bandwidth. Also, if beam direction is to be changed, switching time is required. The number of beams generated simultaneous by an analog beamforming depends on the number of TXRU. Note that for a given size of array, the increase of TXRU may decrease the antenna element of each beam, such that wider beam would be generated. In short, analog beamforming could avoid the complexity and heat problem of digital beamforming, while is more restricted in operation. Hybrid beamforming can be considered as a compromise between analog and digital beamforming, where the beam can come from both analog and digital domain.

Figure 5A:
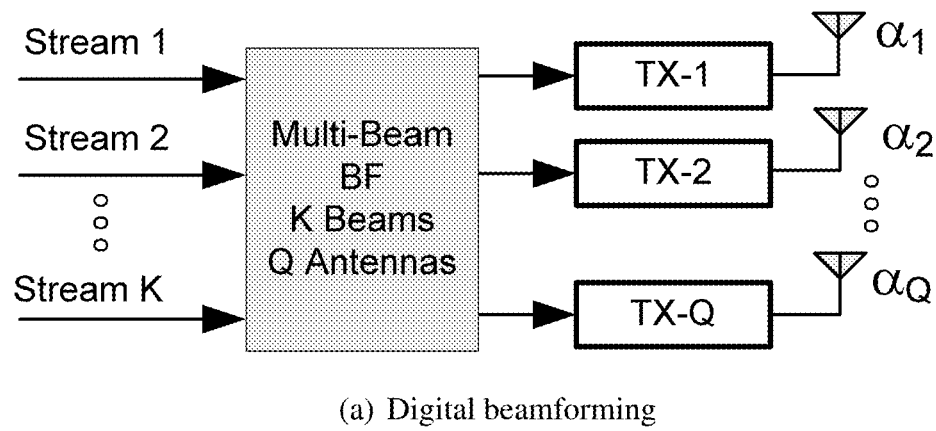
Figure 5B:
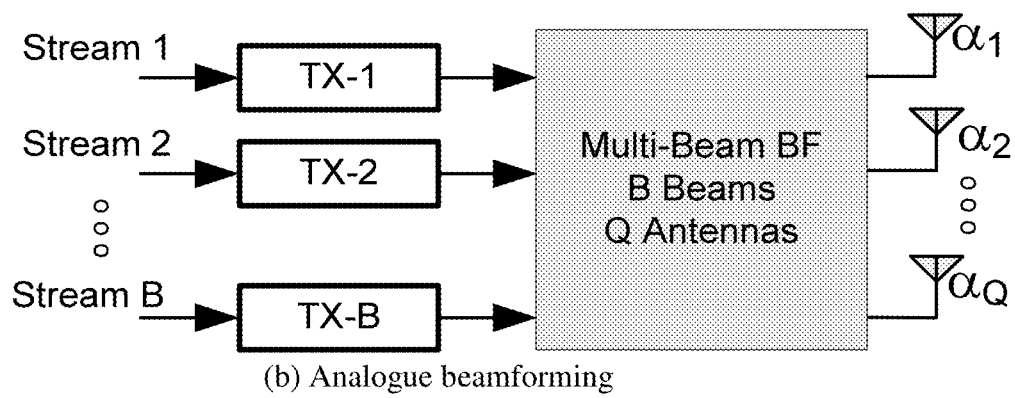

FIGS. 5A-5C provide exemplary illustrations of the three types of beamforming.

Figure 6:
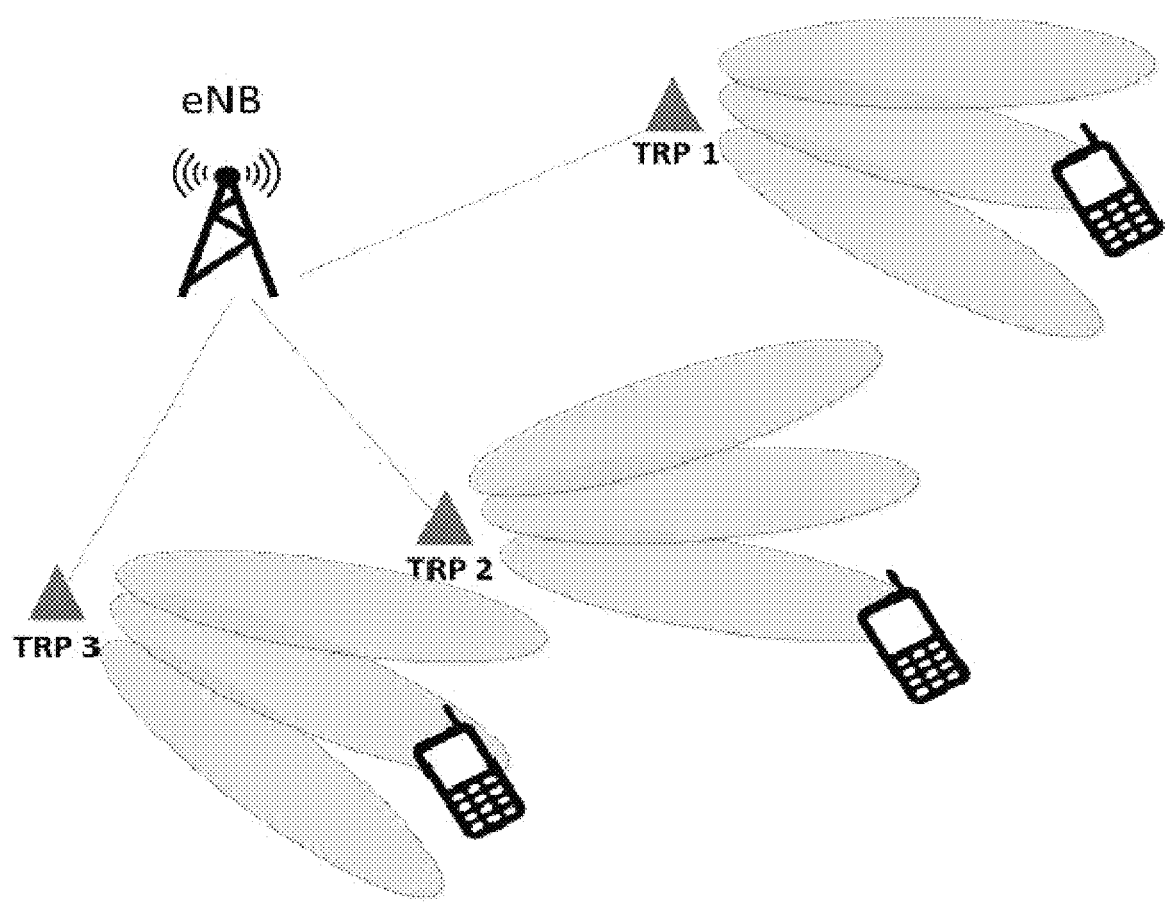
FIG. 6 is a reproduction of FIG. 1 of 3GPP R2-162709.

Based on 3GPP R2-162709 and as shown in FIG. 6, an eNB may have multiple TRPs (either centralized or distributed). Each TRP (Transmission/Reception Point) can form multiple beams. The number of beams and the number of simultaneous beams in the time/frequency domain depend on the number of antenna array elements and the RF (Radio Frequency) at the TRP.

Potential mobility type for NR can be listed as follows:
Intra-TRP mobility
Inter-TRP mobility
Inter-NR eNB mobility Based on 3GPP R2-162762, reliability of a system purely relying on beamforming and operating in higher frequencies might be challenging, since the coverage might be more sensitive to both time and space variations. As a consequence of that the SINR (Signal to Interference Plus Noise Ratio) of that narrow link can drop much quicker than in the case of LTE.

Using antenna arrays at access nodes with the number of elements in the hundreds, fairly regular grid-of-beams coverage patterns with tens or hundreds of candidate beams per node may be created. The coverage area of an individual beam from such array may be small, down to the order of some tens of meters in width. As a consequence, channel quality degradation outside the current serving beam area is quicker than in the case of wide area coverage, as provided by LTE.

Figure 7:
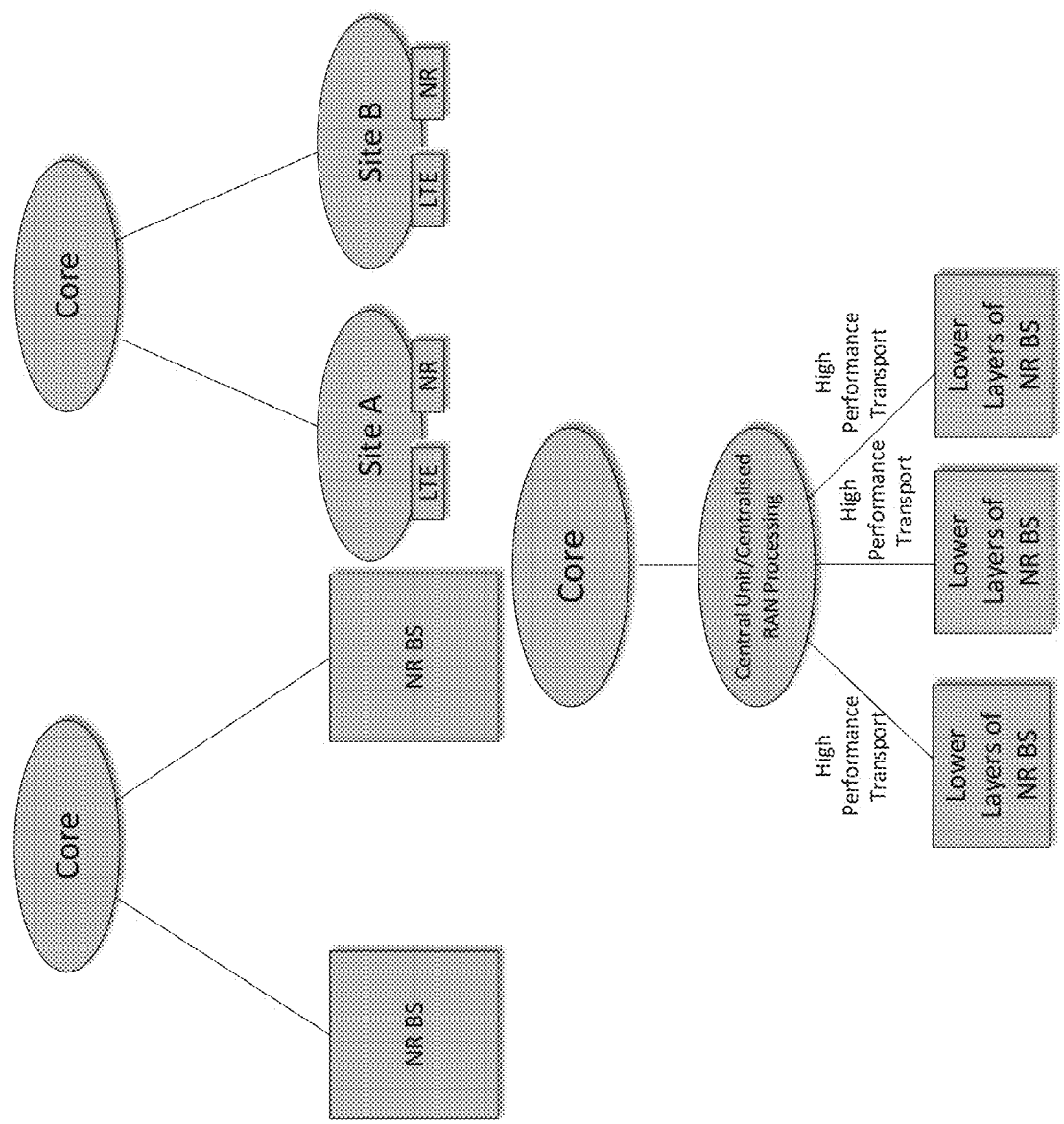
FIGS. 7 and 8 are reproduction of figures of 3GPP R2-160947.
Figure 8:
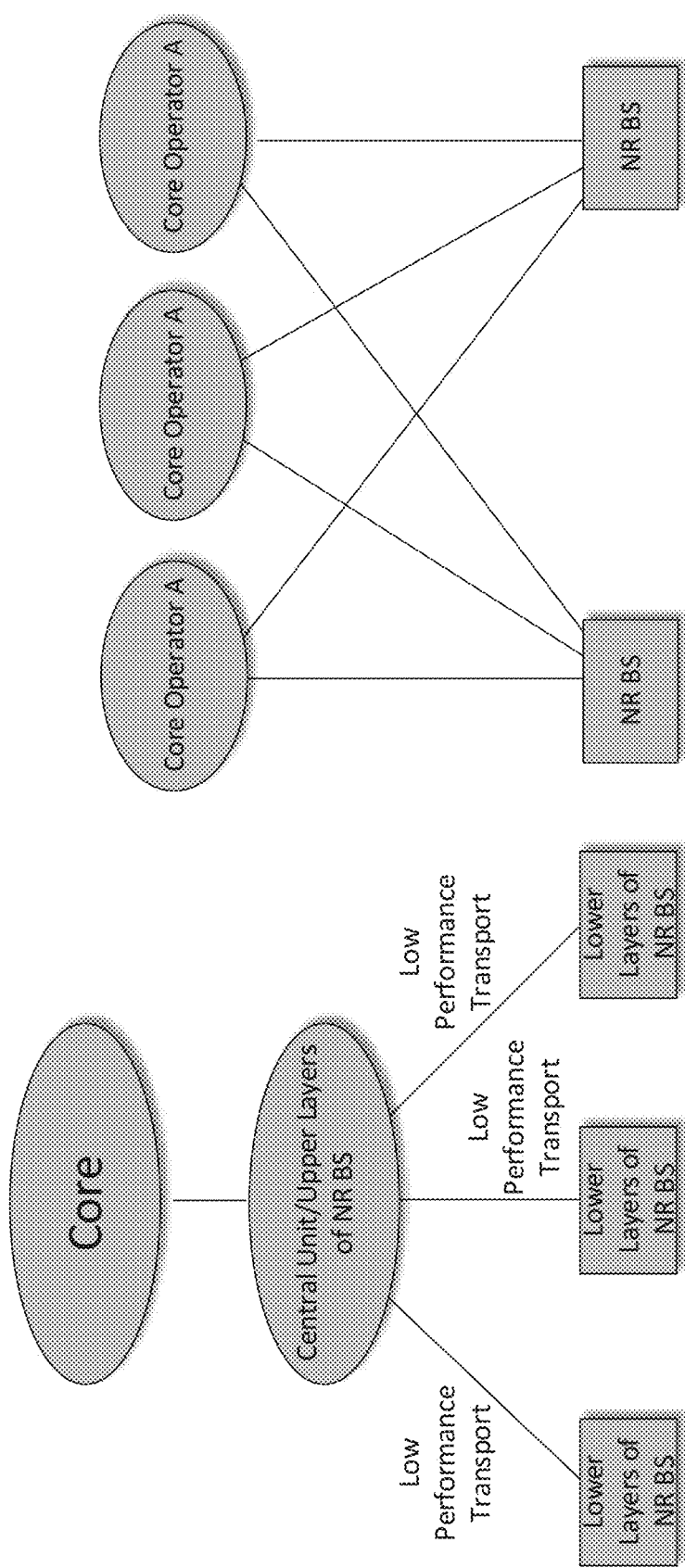

Based on 3GPP R3-160947, the scenarios illustrated in FIGS. 7 and 8 should be considered for support by the NR radio network architecture.

Based on 3GPP R2-164306, the following scenarios in terms of cell layout for standalone NR are captured to be studied:
Macro cell only deployment
Heterogeneous deployment
Small cell only deployment Based on 3GPP RAN2#94 meeting minutes, 1 NR eNB corresponds to 1 or many TRPs. Two levels of network controlled mobility:
RRC driven at "cell" level.
Zero/Minimum RRC involvement (e.g. at MAC/PHY)

Figure 9:
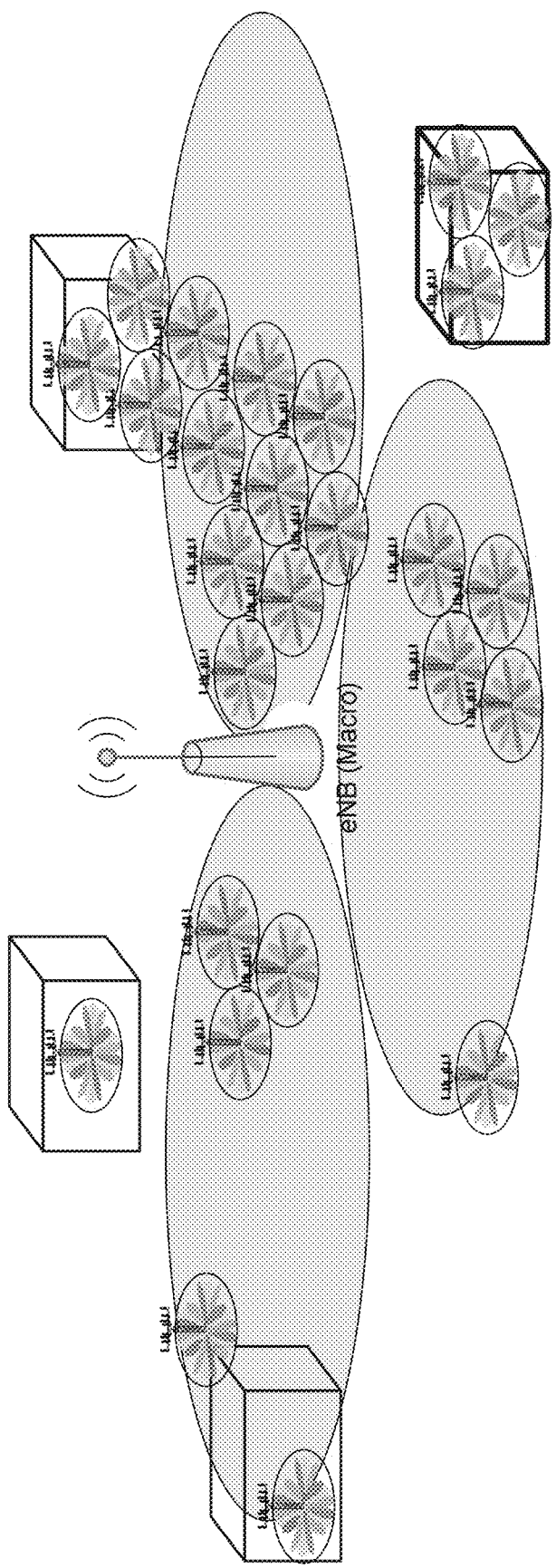
FIG. 9 shows an exemplary deployment with single TRP cell.
Figure 10:
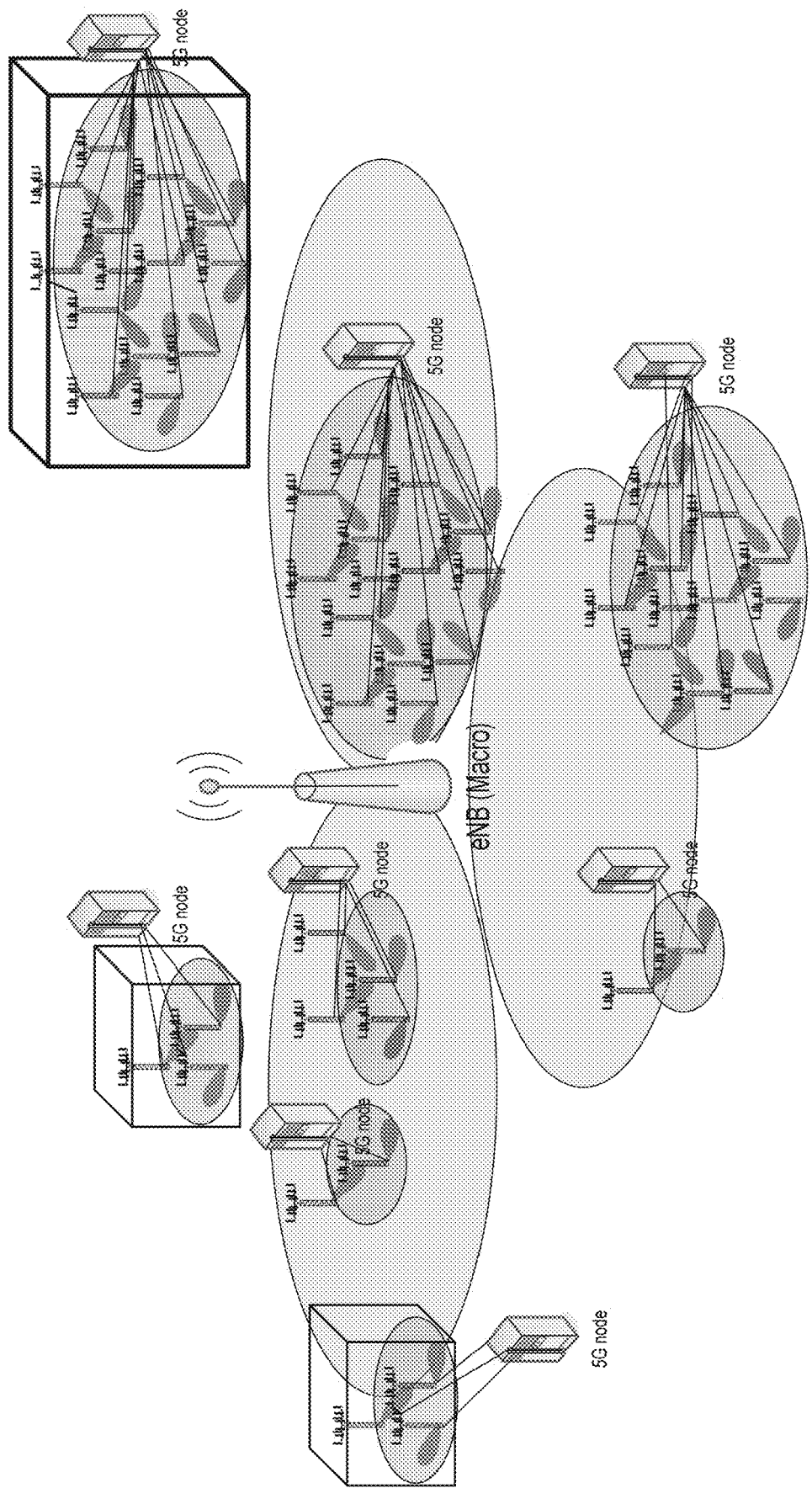
FIG. 10 shows an exemplary deployment with multiple TRP cells.
Figure 11:
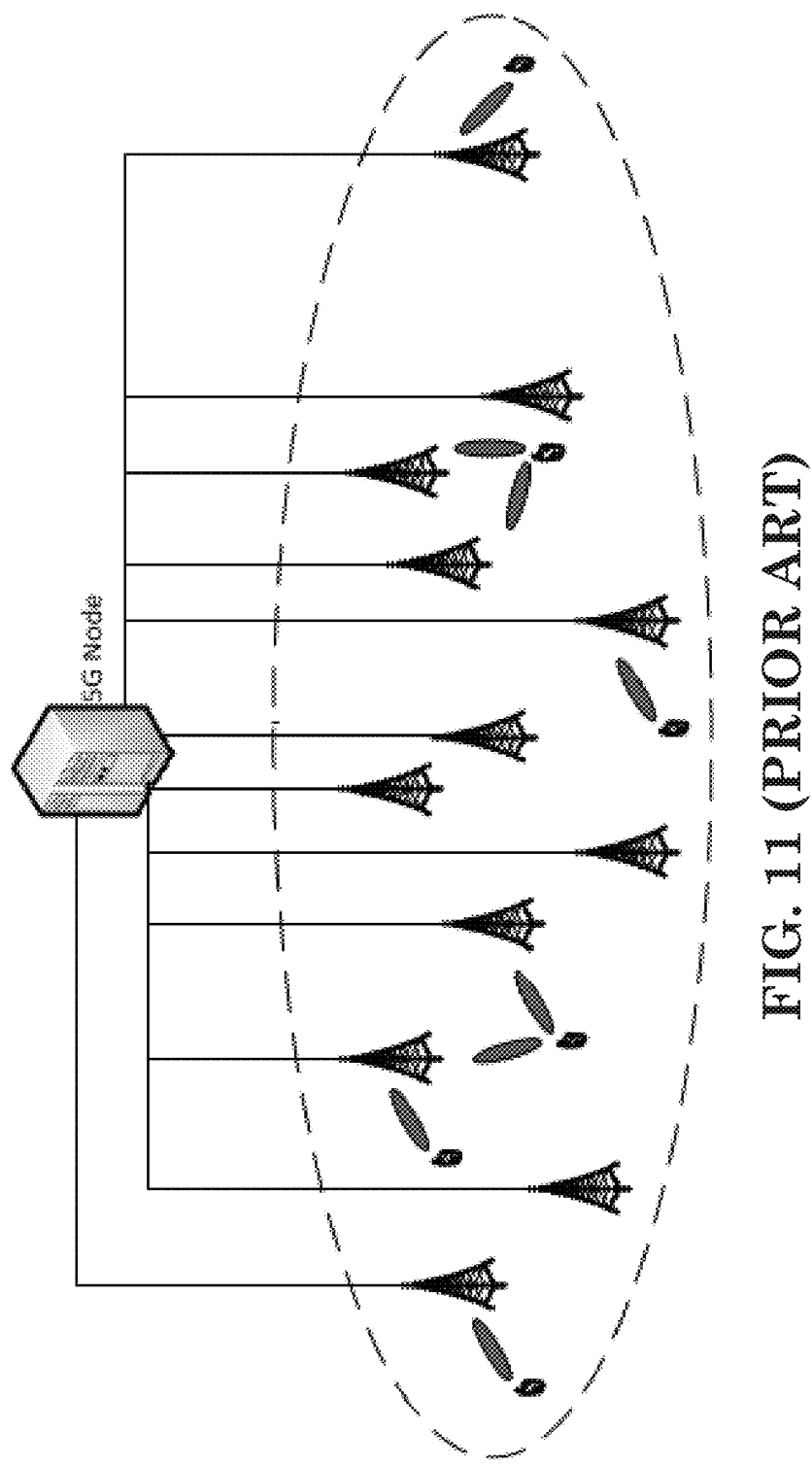
FIG. 11 shows an exemplary 5G cell comprising a 5G node with multiple TRPs.
Figure 12:
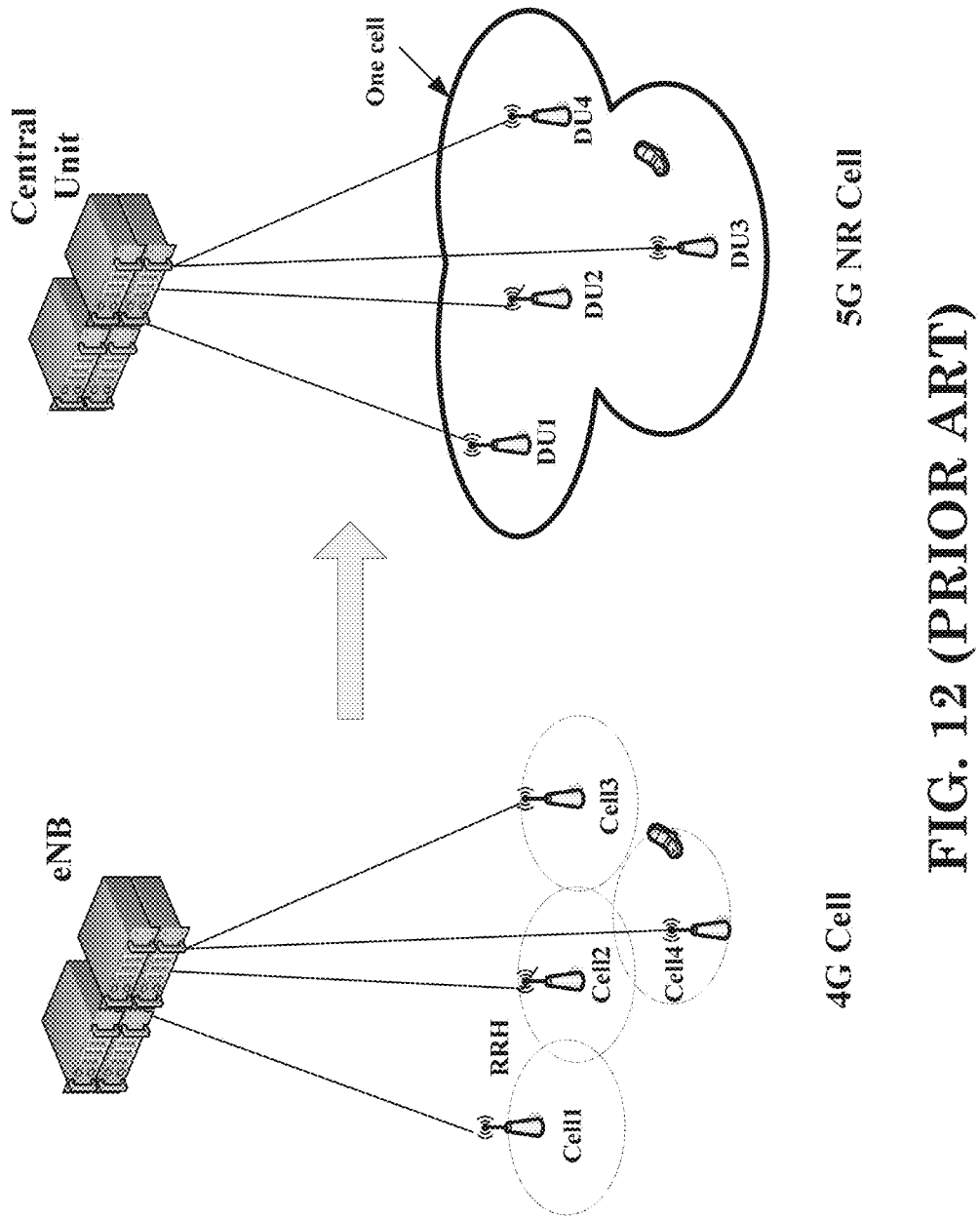
FIG. 12 shows an exemplary comparison between a LTE cell and a NR cell.

FIGS. 9 to 12 show some examples of the concept of a cell in 5G NR. FIG. 9 is a reproduction of a portion of FIG. 1 of 3GPP R2-163879, and shows exemplary different deployment scenarios with single TRP cell. FIG. 10 is a reproduction of a portion of FIG. 1 of 3GPP R2-163879, and shows exemplary different deployment scenarios with multiple TRP cells. FIG. 11 is a reproduction of FIG. 3 of 3GPP R2-162210, and shows an exemplary 5G cell comprising a 5G node with multiple TRPs. FIG. 12 is a reproduction of FIG. 1 of 3GPP R2-163471, and shows an exemplary comparison between a LTE cell and a NR cell.

Figure 16:
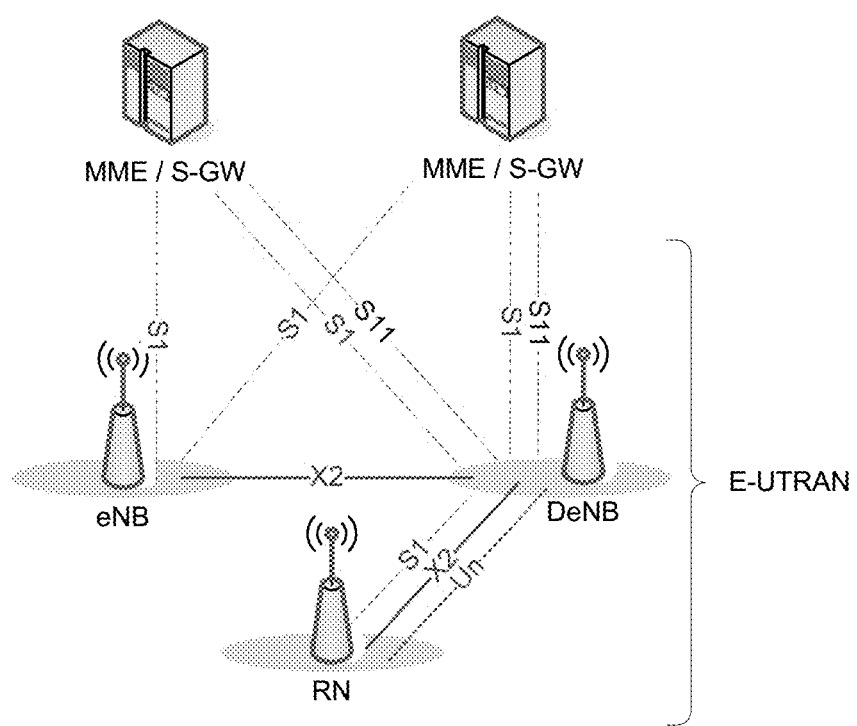
FIG. 16 is a reproduction FIG. 4-1 of 3GPP TS 36.300 V14.4.0.

In LTE (as discussed in 3GPP TS 36.300), E-UTRAN supports a relay node (RN) wirelessly connecting to a Donor eNB (DeNB) via Un interface as shown in FIG. 16 (which is a reproduction FIG. 4-1 of 3GPP TS 36.300 V14.4.0). RN configures MBSFN subframes for subframes configured for DeNB-to-RN transmission (as discussed in the LTE-Advanced Relay presentation dated Oct. 18, 2011). RN does not allow UE-to-RN transmissions in subframes for RN-to-DeNB transmissions.

3GPP TS 36.814 specifies properties and classifications of the relay as shown in FIG. 17. As discussed in 3GPP TS 36.814, due to the relay transmitter causing interference to its own receiver, simultaneous eNodeB-to-relay and relay-to-UE transmissions on the same frequency resource may not be feasible unless sufficient isolation of the outgoing and incoming signals is provided.

General principle for resource partitioning at the relay are as follows:
eNB→RN and RN→UE links are time division multiplexed in a single carrier frequency (only one is active at any time)
RN→eNB and UE→RN links are time division multiplexed in a single carrier frequency (only one is active at any time)

As discussed in 3GPP TS 36.216, resource multiplexing between access link and backhaul link follows semi-static scheduling as follows:
Downlink subframes configured for eNB-to-RN transmission shall be configured as MBSFN subframes by the relay node.
For frame structure type 1, a subframe configured for eNB-to-RN transmission is a subframe satisfying $[(10 \cdot n_f + \lfloor n_s/2 \rfloor) \bmod 8] \in \Delta_{BSC}$.
A subframe n is configured for RN-to-eNB transmission if subframe n−4 is configured for eNB-to-RN transmission.
For frame structure type 2, the subframes that can be configured for eNB-RN transmission are listed in the table in FIG. 18.

As discussed in 3GPP TS 36.216, the eNB-to-RN transmissions shall be restricted to a subset of the OFDM (Orthogonal Frequency Division Multiplexing) symbols in a slot.
The starting and ending OFDM symbols respectively in the first slot of a subframe is given in the table in FIG. 19A. The parameter DL-StartSymbol is configured by higher layers.
The starting and ending OFDM symbols respectively in the second slot of a subframe is given in the table in FIG. 19B.

As discussed in 3GPP TS 36.216, as for RN-to-eNB data transmission, the relay node shall not expect HARQ (Hybrid Automatic Repeat Request) feedback on PHICH (Physical Hybrid-ARQ Indicator Channel). ACK (Acknowledgement) shall be delivered to higher layers for each transport block transmitted on PUSCH (Physical Uplink Shared Channel). (No R-PCFICH, No R-PHICH) PUCCH (Physical Uplink Control Channel) resource for HARQ-ACK and SR (Scheduling Request) are configured via higher layer.

Figure 20:
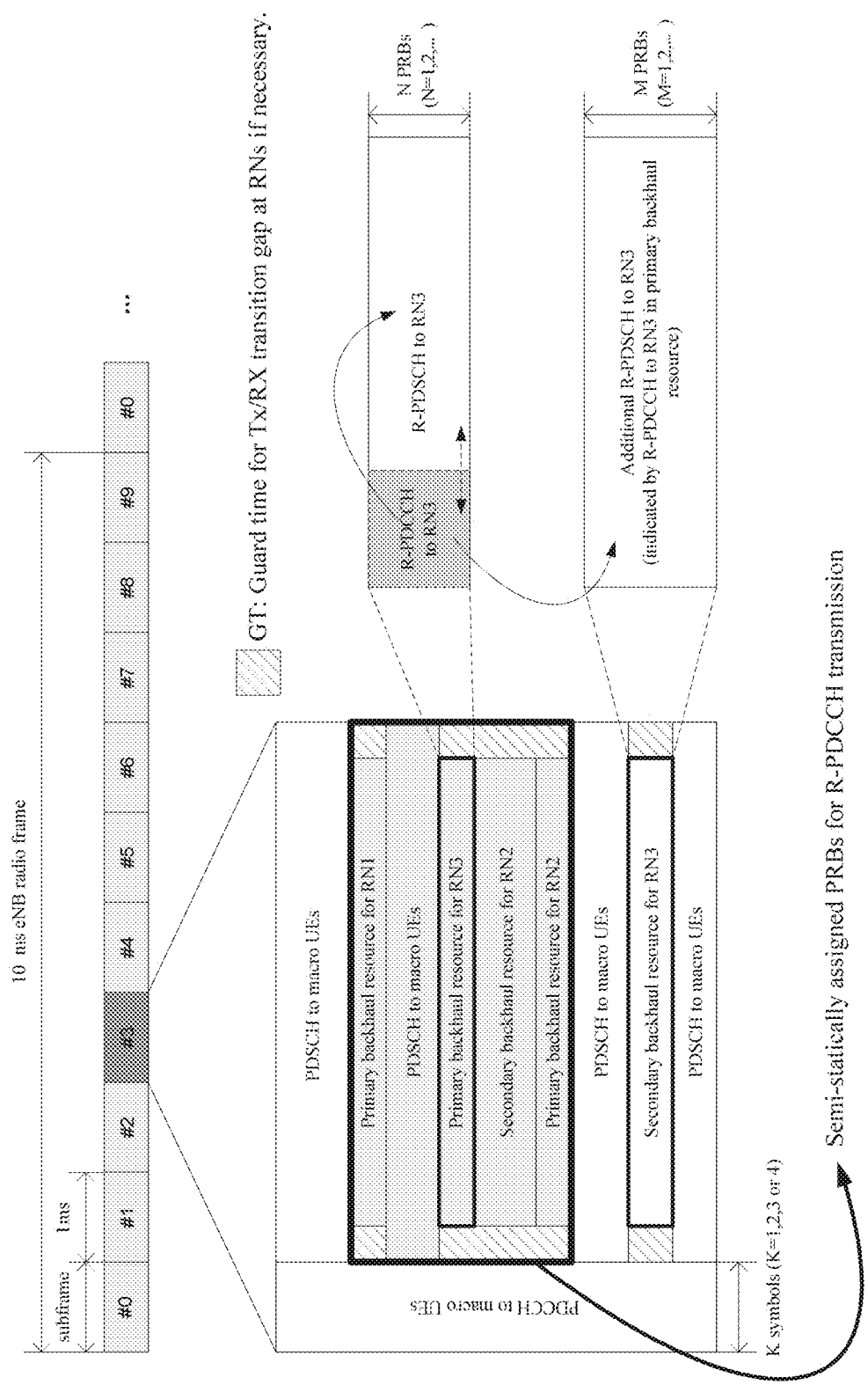
FIG. 20 is a reproduction of FIG. 1 of 3GPP R1-102421.

The relay node shall monitor the set of configured VRBs (Virtual Resource Blocks) in the first slot for an R-PDCCH (Relay Physical Downlink Control Channel) containing a downlink assignment. The relay node shall monitor the set of configured VRBs in the second slot for an R-PDCCH containing an uplink grant. R-PDSCH can be in the first slot and/or second slot. FIG. 20 (which is a reproduction of FIG. 1 of 3GPP R1-102421) shows an exemplary instance of eNB-to-RN transmission.

3GPP RP-171880 states:
One of the potential technologies targeted to enable future cellular network deployment scenarios and applications is the support for wireless backhaul and relay links enabling flexible and very dense deployment of NR cells without the need for densifying the transport network proportionately. Due to the expected larger bandwidth available for NR compared to LTE (e.g. mmWave spectrum) along with the native deployment of massive MIMO or multi-beam systems in NR creates an opportunity to develop and deploy integrated access and backhaul links. This may allow easier deployment of a dense network of self-backhauled NR cells in a more integrated manner by building upon many of the control and data channels/procedures defined for providing access to UEs. An example illustration of a network with such integrated access and backhaul links is shown in FIG. 1, where relay nodes (rTRPs) can multiplex access and backhaul links in time, frequency, or space (e.g. beam-based operation).

Figure 21:
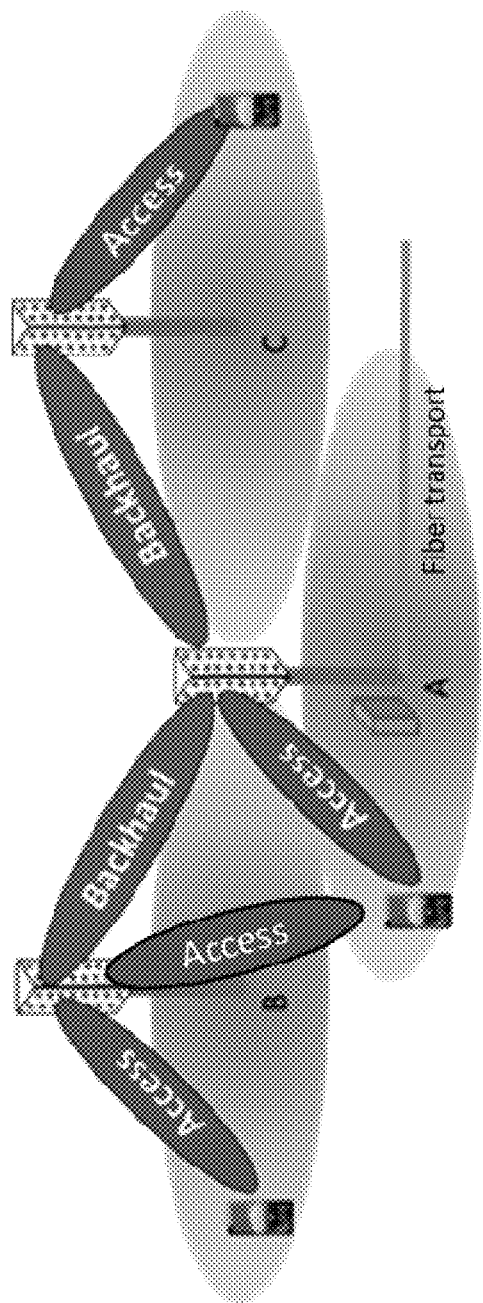
FIG. 21 is a reproduction of FIG. 1 of 3GPP RP-171880.

FIG. 1 of 3GPP RP-171880, Entitled "Integrated Access and Backhaul Links", is Reproduced as FIG. 21

The operation of the different links may be on the same or different frequencies (also termed 'in-band' and 'out-band' relays). While efficient support of out-band relays is important for some NR deployment scenarios, it is critically important to understand the requirements of in-band operation which imply tighter interworking with the access links operating on the same frequency to accommodate duplex constraints and avoid/mitigate interference.

In addition, operating NR systems in mmWave spectrum presents some unique challenges including experiencing severe short-term blocking that may not be readily mitigated by present RRC-based handover mechanisms due to the larger time-scales required for completion of the procedures compared to short-term blocking. Overcoming short-term blocking in mmWave systems may require fast RAN-based mechanisms for switching between rTRPs, which do not necessarily require involvement of the core network. The above described need to mitigate short-term blocking for NR operation in mmWave spectrum along with the desire for easier deployment of self-backhauled NR cells creates a need for the development of an integrated framework that allows fast switching of access and backhaul links. Over-the-air (OTA) coordination between rTRPs can also be considered to mitigate interference and support end-to-end route selection and optimization.

There are some agreements on beam management in the RAN1 #85 meeting, as stated in the Final Report of 3GPP TSG RAN WG1 #85 v1.0.0 (Nanjing, China, 23-27 May 2016) as follows:
Agreements:
  Following three implementations of beamforming are to be studied in NR
    Analog beamforming
    Digital beamforming
    Hybrid beamforming
    Note: The physical layer procedure design for NR can be agnostic to UE/TRP with respect to the beamforming implementations employed at TRP/UE, but it may pursue beamforming implementation specific optimization not to lose efficiency
  RAN1 studies both multi-beam based approaches and single-beam based approaches for these channels/signals/measurement/feedback
    Initial-access signals (synchronization signals and random access channels)
    System-information delivery
    RRM measurement/feedback
    L1 control channel
    Others are FFS
    Note: The physical layer procedure design for NR can be unified as much as possible whether multi-beam or single-beam based approaches are employed at TRP at least for synchronization signal detection in stand-alone initial access procedure
    Note: single beam approach can be a special case of multi beam approach
    Note: Individual optimization of single beam approach and multiple beam approach is possible
  Multi-beam based approaches
    In Multi-beam based approaches, multiple beams are used for covering a DL coverage area and/or UL coverage distance of a TRP/a UE
    One example of multi-beam based approaches is beam sweeping:
      When beam sweeping is applied for a signal (or a channel), the signal (the channel) is transmitted/received on multiple beams, which are on multiple time instances in finite time duration
        Single/multiple beam can be transmitted/received in a single time instance
    Others are FFS
  Single-beam based approaches
    In single-beam based approaches, the single beam can be used for covering a DL coverage area and/or UL coverage distance of a TRP/a UE, similarly as for LTE cell-specific channels/RS
[ . . . ]
Agreements:
  RAN1 to study the beamforming procedures and their system impacts at least for multi beam based approach
    Physical layer procedures for beamforming optimizing different metrics such as overheads and latencies in multi beam and single beam based approaches
    Physical layer procedures in multi beam based approach that require beam training, i.e. steering of transmitter and/or receiver beams
      E.g. Periodic/Aperiodic downlink/uplink TX/RX beam sweeping signals, where periodic signals may be semi-statically or dynamically configured (FFS)
      E.g. UL sounding signals
      Other example is not precluded
Agreements:
  Both intra-TRP and inter-TRP beamforming procedures are considered.
  Beamforming procedures are considered with/without TRP beamforming/beam sweeping and with/without UE beamforming/beam sweeping, according to the following potential use cases:
    UE movement, UE rotation, beam blocking:
      Change of beam at TRP, same beam at UE
      Same beam at TRP, change of beam at UE
      Change of beam at TRP, change of beam at UE
    Other cases are not precluded
Agreement
Study the necessity of QCL and measurement assumptions for antenna ports in NR There are some agreements on beam management in the RAN1 #86bis meeting, as stated in the Final Report of 3GPP TSG RAN WG1 #86bis v1.0.0 (Lisbon, Portugal, 10-14 Oct. 2016) as follows:
Working Assumption:
  The followings are defined as Tx/Rx beam correspondence at TRP and UE:
  Tx/Rx beam correspondence at TRP holds if at least one of the following is satisfied:
    TRP is able to determine a TRP Rx beam for the uplink reception based on UE's downlink measurement on TRP's one or more Tx beams.
    TRP is able to determine a TRP Tx beam for the downlink transmission based on TRP's uplink measurement on TRP's one or more Rx beams Tx/Rx beam correspondence at UE holds if at least one of the following is satisfied:
  UE is able to determine a UE Tx beam for the uplink transmission based on UE's downlink measurement on UE's one or more Rx beams.
  UE is able to determine a UE Rx beam for the downlink reception based on TRP's indication based on uplink measurement on UE's one or more Tx beams.
More refined definition can still be discussed One or multiple of following terminologies may be used hereafter:
  BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.
  TRP: A transmission and reception point provides network coverage and directly communicates with UEs. TRP could also be referred to as distributed unit (DU) or network node.
  Cell: A cell is composed of one or multiple associated TRPs, i.e. coverage of the cell is composed of coverage of all associated TRP(s). One cell is controlled by one BS. Cell could also be referred to as TRP group (TRPG).
  Beam sweeping: In order to cover all possible directions for transmission and/or reception, a number of beams is required. Since it is not possible to generate all these beams concurrently, beam sweeping means to generate a subset of these beams in one time interval and change generated beam(s) in other time interval(s), i.e. changing beam in time domain. So, all possible directions can be covered after several time intervals.
  Beam sweeping number: A necessary number of time interval(s) to sweep beams in all possible directions once for transmission and/or reception. In other words, a signaling applying beam sweeping would be transmitted "beam sweeping number" of times within one time period, e.g. the signaling is transmitted in (at least partially) different beam(s) in different times of the time period.
  Serving beam: A serving beam for a UE is a beam generated by a network node, e.g. TRP, which is currently used to communicate with the UE, e.g. for transmission and/or reception.
  Candidate beam: A candidate beam for a UE is a candidate of a serving beam. Serving beam may or may not be candidate beam.
  Qualified beam: A qualified beam is a beam with radio quality, based on measuring signal on the beam, better than a threshold.
  The best serving beam: The serving beam with the best quality (e.g. the highest BRSRP value).
  The worst serving beam: The serving beam with the worst quality (e.g. the worst BRSRP value).

One or multiple of following assumptions for network side may be used hereafter:
  NR using beamforming could be standalone, i.e. UE can directly camp on or connect to NR.
    NR using beamforming and NR not using beamforming could coexist, e.g. in different cells.
  TRP would apply beamforming to both data and control signaling transmissions and receptions, if possible and beneficial.
  Number of beams generated concurrently by TRP depends on TRP capability, e.g. maximum number of beams generated concurrently by different TRPs may be different.
  Beam sweeping is necessary, e.g. for the control signaling to be provided in every direction.
  (For hybrid beamforming) TRP may not support all beam combinations, e.g. some beams could not be generated concurrently. FIG. 18 shows an example for combination limitation of beam generation.
  Downlink timing of TRPs in the same cell are synchronized.
  RRC layer of network side is in BS.
  TRP should support both UEs with UE beamforming and UEs without UE beamforming, e.g. due to different UE capabilities or UE releases.

Figure 13:
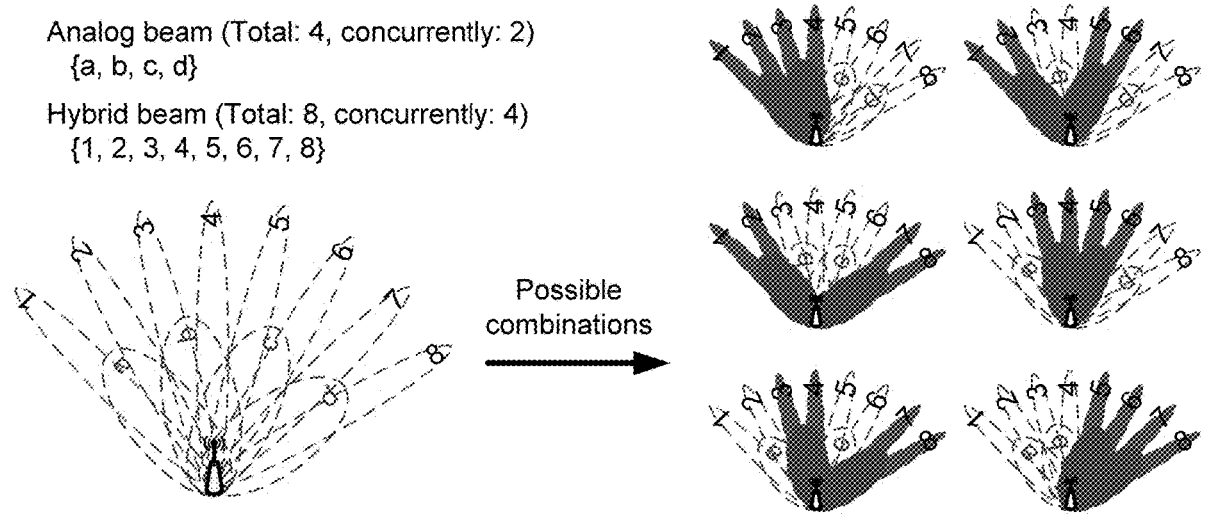
FIG. 13 shows an exemplary combination limitation of beam generation.

One or multiple of following assumptions for UE side may be used hereafter:
  UE may perform beamforming for reception and/or transmission, if possible and beneficial.
    Number of beams generated concurrently by UE depends on UE capability, e.g. generating more than one beam is possible.
    Beam(s) generated by UE is wider than beam(s) generated by TRP, gNB, or eNB.
    Beam sweeping for transmission and/or reception is generally not necessary for user data but may be necessary for other signaling, e.g. to perform measurement.
    (For hybrid beamforming) UE may not support all beam combinations, e.g. some beams could not be generated concurrently. FIG. 13 shows an example of combination limitation of beam generation.
  Not every UE supports UE beamforming, e.g. due to UE capability or UE beamforming is not supported in NR first (few) release(s).
  One UE is possible to generate multiple UE beams concurrently and to be served by multiple serving beams from one or multiple TRPs of the same cell.
    Same or different (DL or UL) data could be transmitted on the same radio resource via different beams for diversity or throughput gain.
  There are at least two UE (RRC) states: connected state (or called active state) and non-connected state (or called inactive state or idle state). Inactive state may be an additional state or belong to connected state or non-connected state.

Figure 14:
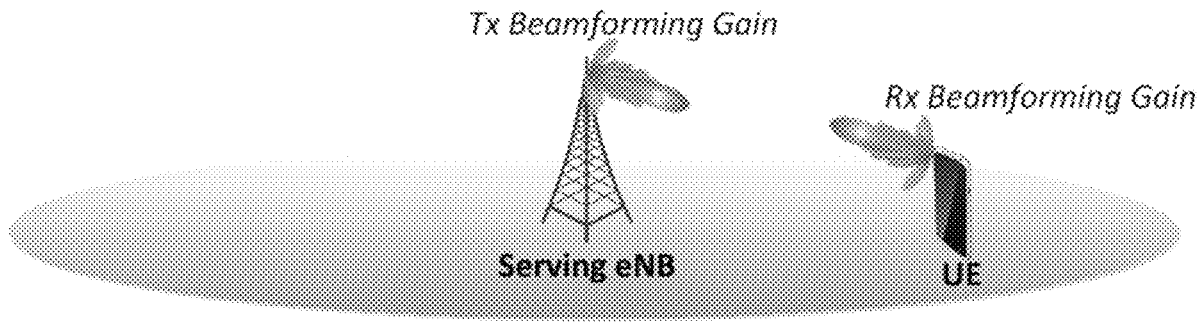
FIG. 14 is a reproduction of FIG. 3 of 3GPP R2-162251.

Based on 3GPP R2-162251, to use beamforming in both eNB and UE sides, practically, antenna gain by beamforming in eNB is considered about 15 to 30 dBi and the antenna gain of UE is considered about 3 to 20 dBi. FIG. 14 (a reproduction of FIG. 3 of 3GPP R2-162251) illustrates gain compensation by beamforming.

Figure 15:
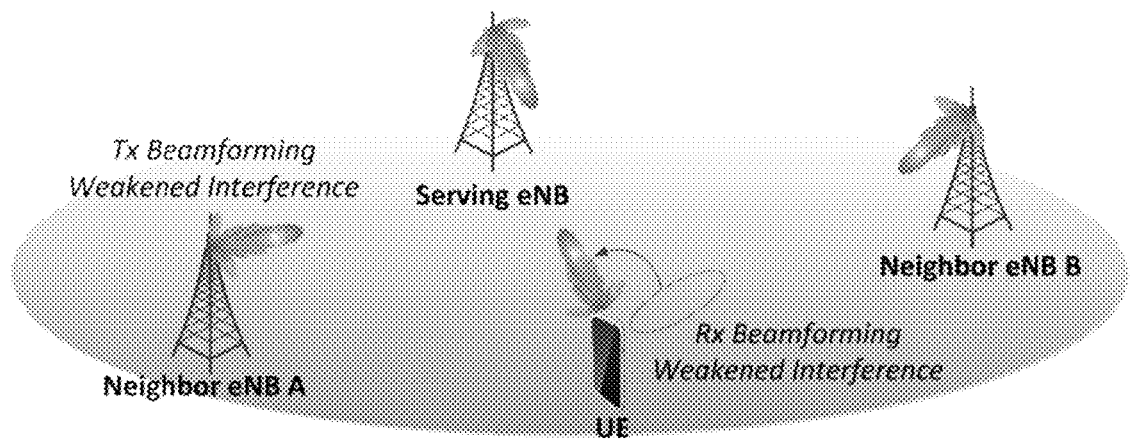
FIG. 15 is a reproduction of FIG. 4 of 3GPP R2-162251.

From the SINR perspective, sharp beamforming reduces interference power from neighbor interferers, i.e. neighbor eNBs in downlink case or other UEs connected to neighbor eNBs. In TX beamforming case, only interference from other TXs whose current beam points the same direction to the RX will be the "effective" interference. The "effective" interference means that the interference power is higher than the effective noise power. In RX beamforming case, only interference from other TXs whose beam direction is the same to the UE's current RX beam direction will be the effective interference. FIG. 15 (a reproduction of FIG. 4 of 3GPP R2-162251) illustrates a weakened interference by beamforming.

As described in 3GPP RP-171880, integrated access and backhaul links are considered for support for wireless backhaul and relay links enabling flexible and very dense deployment of NR cells. Larger bandwidth (e.g. mmWave spectrum) and massive MIMO or multi-beam systems in NR are expected compared to LTE.

Supporting in-band relays, such that backhaul link and access link are on the same frequency, is quite important deployment scenarios. Relay nodes can multiplex access and backhaul links in time, frequency, or space (e.g. beam-based operation).

As the transmitter of a relay node (RN) may cause interference to its own receiver, like a kind of self-interference, simultaneous reception and transmission on the same frequency resource at the relay node may not be feasible unless sufficient isolation of the outgoing and incoming signals is provided. In one possible way, the reception and transmission at the relay node may be performed on different beams or different antenna panels. If a transmission beam and a reception beam are beamformed via at least one same antenna or antenna element, the self-interference may occur for the transmission beam and the reception beam. On the other hand, Time Division Multiplexing (TDM) may be adopted for transmission and reception at a relay node.

Figure 22:
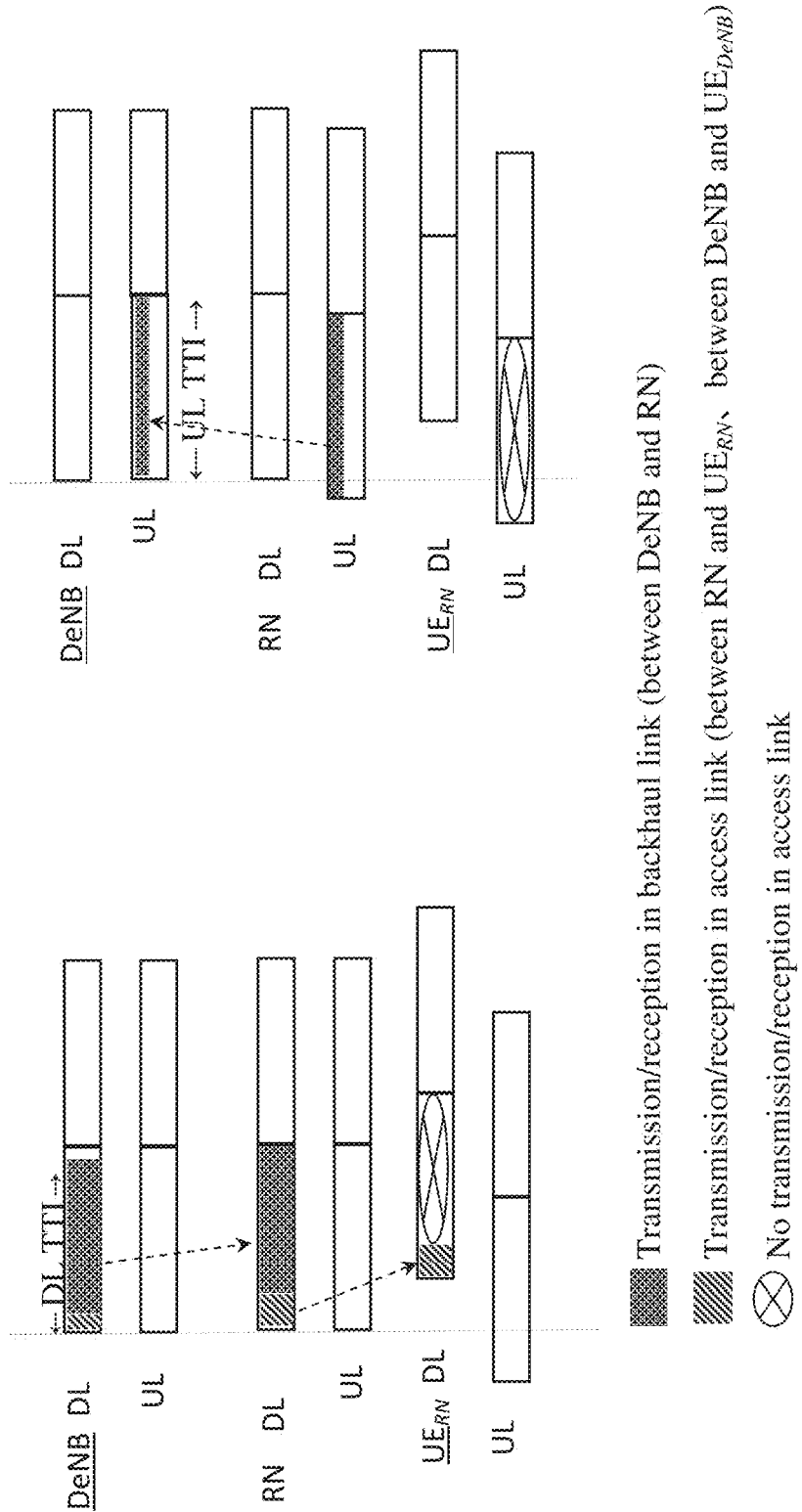
FIG. 22 is a diagram according to one exemplary embodiment.

In LTE/LTE-A (discussed in 3GPP TS 36.216), TDM is the way adopted to avoid self-interference. As shown in FIG. 22, for DeNB-to-RN transmission in downlink subframe, the DeNB (Donor eNB) transmits downlink control signaling and/or downlink data transmission to RN with part of the subframe. The starting symbol of the part of the subframe is one of the 2nd, 3rd, and 4th symbol depending on relay configuration. The ending symbol of the part of the subframe is the penultimate symbol if downlink subframes are transmitted with time aligned subframe boundaries by the donor DeNB and the relay node; otherwise the last symbol. In the downlink subframe, the RN can transmit to UE served by the RN (noted as $UE_{RN}$) before receiving transmission from DeNB. When RN receives transmission from DeNB, the RN cannot simultaneously transmit to UE served by the RN. In other word, the DeNB-to-RN transmission and RN-to-UE transmission are multiplexed in TDM. Moreover, the RN cannot receive transmission from UE since the subframe is downlink subframe.

From the RN-to-DeNB transmission in LTE/LTE-A, the RN transmits control signaling and/or data transmission as following the behavior of UEs served by the DeNB ($UE_{DeNB}$). Thus, RN will adopt TA (timing advance) to perform the RN-to-DeNB transmission to DeNB in uplink subframe as shown in FIG. 22. More specifically, the TA takes into account the Round Trip Delay (RTD) between RN and DeNB in order to compensate the transmission/propagation delay between RN and DeNB. The TA may be set the same as the RTD. When the RN transmits transmission to the DeNB, the RN cannot simultaneously receive from UE served by the RN. n other word, the RN-to-DeNB transmission and UE-to-RN transmission are multiplexed in TDM. Moreover, the RN cannot transmit transmission to UE since the subframe is uplink subframe.

In NR, network could provide slot format related information (SFI) to indicate symbol or slot structure to UE. The slot format related information informs the UEs of the number of slots and the slot format(s) related information of those slots. The symbol or slot may be set to DL, UL, Unknown, or Reserved. "Unknown" resource could be "flexible" and may be overridden by at least by DCI indication. "Reserved" resource could be "not transmit" and "not receive" but cannot be overridden by DCI/SFI indication.

Network can provide slot format related information (SFI) via any of semi-static DL or UL assignment, dynamic SFI, and DCI scheduling UE specific transmission. The semi-static DL or UL assignment may indicate states comprising DL, UL, Unknown, or Reserved. The network provides semi-static DL or UL assignment via Cell-specific RRC configuration (e.g. SIB) and/or additionally UE-specific RRC configuration. The UE-specific RRC configuration may overwrite the "unknown" state of the cell-specific RRC configuration.

Moreover, the dynamic SFI may indicate states comprising DL, UL, or Unknown. The UE may monitor/receive GC-PDCCH carrying dynamic SFI. The "Unknown" in semi-static DL or UL assignment may be overwritten by dynamic SFI. The "DL" or "UL" in semi-static DL or UL assignment cannot be overwritten to "unknown" or the other direction (DL to UL or UL to DL) by dynamic SFI.

Furthermore, DCI scheduling UE specific transmission may indicate states comprising DL, or UL. The UE may monitor or receive downlink control signaling or channel to acquire DCI scheduling UE specific transmission, such as UE specific DCI triggered downlink data transmission, uplink data transmission, reference signal triggering, beam report, CSI report, and A/N for a downlink data transmission. The "UL" or "DL" in dynamic SFI and semi-static DL or UL assignment cannot be overwritten by DCI scheduling UE specific transmission. "Unknown" in dynamic SFI can be overwritten by DCI scheduling UE specific transmission (change to DL or UL). The UE will follow the DCI for UE-specific transmission and reception.

The design in NR allows network to adjust transmission direction. Considering multiple relay nodes (rTRPs) deployment for a cell, if each relay node is able to adjust transmission direction at least for some symbols or TTIs without full cell alignment, it would be more resource-efficient and adaptable based on real traffic with the coverage of each relay node. In other word, even though the full coverage of a same cell comprises the coverage of multiple relay nodes, the transmission direction may be different for separate relay nodes at least for some symbols or TTIs. It is quite different from the LTE/LTE-A. Thus, reusing transmission method in FIG. 22 for backhaul link will limit the transmission direction setting between relay nodes since the TTI for backhaul link between DeNB and relay node in LTE/LTE-A is either set to DL at both DeNB and relay node or set to UL at both DeNB and relay node. In other words, via reusing transmission method in FIG. 22, the DeNB transmits DeNB-to-RN transmission in the TTI with transmission direction set to DL, and the RN receives the DeNB-to-RN transmission in the TTI with transmission direction set to DL. Although the RN performs reception for the DeNB-to-RN transmission, the UEs served by the RN still considers the TTI as DL (MBSFN subframe is DL subframe). Via reusing transmission method in FIG. 22, the RN transmits RN-to-DeNB transmission in the TTI with transmission direction set to UL, and the DeNB receives the RN-to-DeNB transmission in the TTI with transmission direction set to UL. Although the RN performs transmission for the RN-to-DeNB transmission, the UEs served by the RN still considers the TTI as UL.

Moreover, reusing the transmission method in FIG. 22 for backhaul link will forbid transmission in access link when there is transmission in backhaul link. More specifically, it may mean that the RN receives DeNB-to-RN transmission in the TTI with transmission direction set to DL, the RN cannot simultaneously perform transmission or reception in access link for UEs. It may mean that the RN transmits RN-to-DeNB transmission in the TTI with transmission direction set to UL, the RN cannot simultaneously perform transmission or reception in access link for UEs. Although the transmission in access link and in backhaul link may be multiplexed in different beams in NR, the self-interference may still restrict the same transmission direction for some beams. It means that the relay node cannot simultaneously transmit in part of the some beams and receive in other part of the some beams. Thus, considering reusing the transmission method in FIG. 22 for NR backhaul link, it will forbid transmission in access link in other part of the some beams when there is transmission in part of the some beams in backhaul link.

To acquire resource-efficiency and adaptability based on real traffic with coverage of each relay node, some alternatives may be applied. One alternative is to support node-to-node transmission in backhaul link without restriction on each node's transmission direction setting. A transmission in backhaul link from a first network node to a second network node could be performed regardless of the transmission direction settings of the first network node and the second network node. For example, a transmission in backhaul link from a first network node to a second network node could be performed when the transmission direction setting of the first network node is different from the transmission direction setting of the second network node. Thus, each network node (e.g. the first network node, the second network node) can schedule or adjust transmission direction for serving UEs based on real traffic at least for some symbols or TTIs without full cell alignment. Furthermore, each relay node may not know the transmission direction of other relay nodes in time. Accordingly, the transmission in backhaul link should apply the same transmission timing no matter the transmitting node is with transmission direction set to uplink or downlink. Moreover, the reception in backhaul link should apply the same reception timing no matter the receiving node is with transmission direction set to uplink or downlink.

Figure 23:
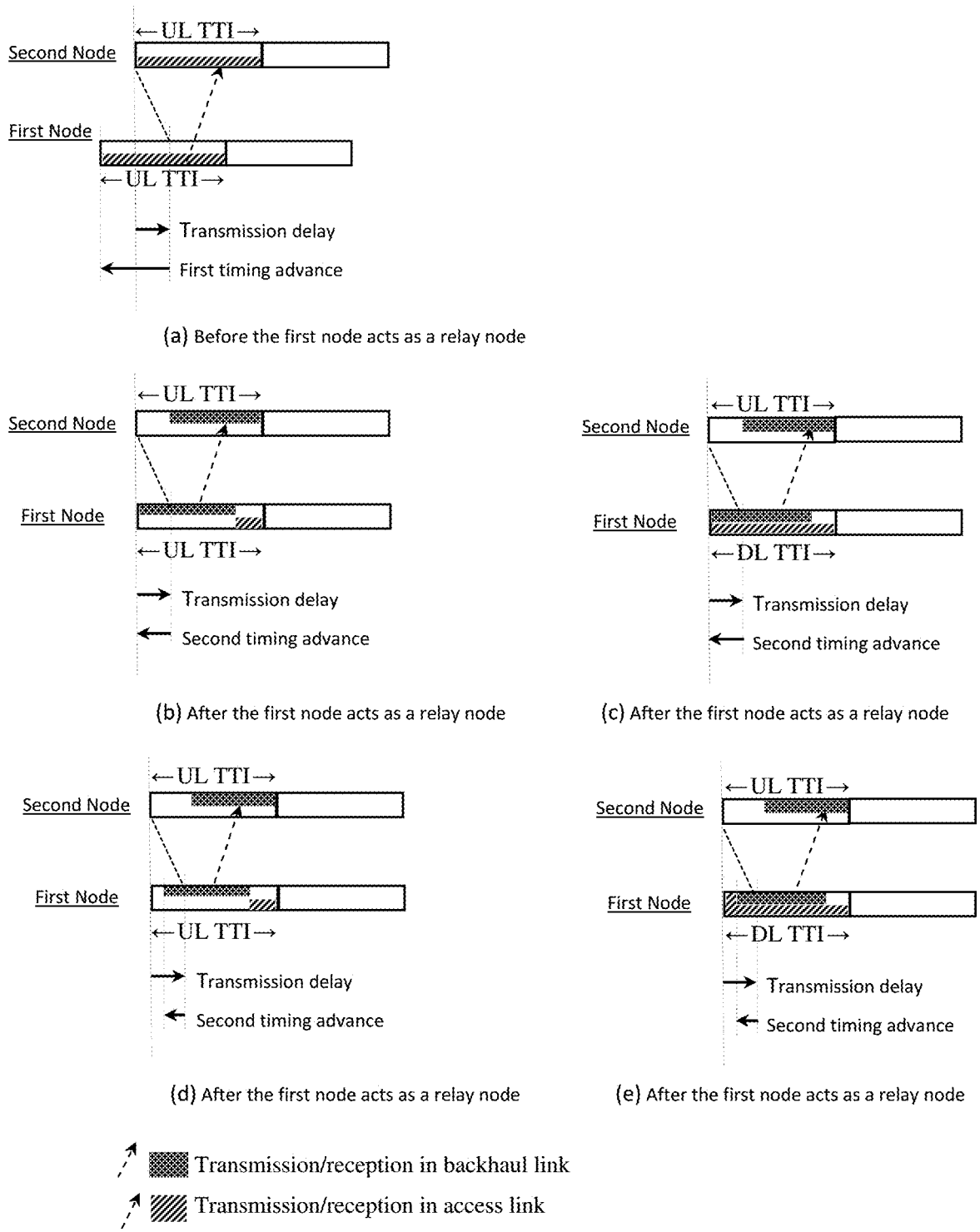
FIG. 23 is a diagram according to one exemplary embodiment.

In first embodiment, for a first network node served by a second network node, the first network node performs a second transmission to the second network node with a second timing advance. The second timing advance is derived from transmission delay between the first network node and the second network node. FIGS. 23(b) and (c) show an instance. In one embodiment, the transmission delay between the first network node and the second network node comprises the transmission or propagation delay from the first network node to the second network node. The transmission delay between the first network node and the second network node could comprise the transmission or propagation delay from the second network node to the first network node, or the average of the transmission or propagation delay from the second network node to the first network node and the transmission or propagation delay from the first network node to the second network node. The transmission delay between the first network node and the second network node could be set to a half of Round Trip Delay between the first network node and second network node. The timing advance could be set to the transmission delay between the first network node and the second network node with a timing reduction.

Figure 24:
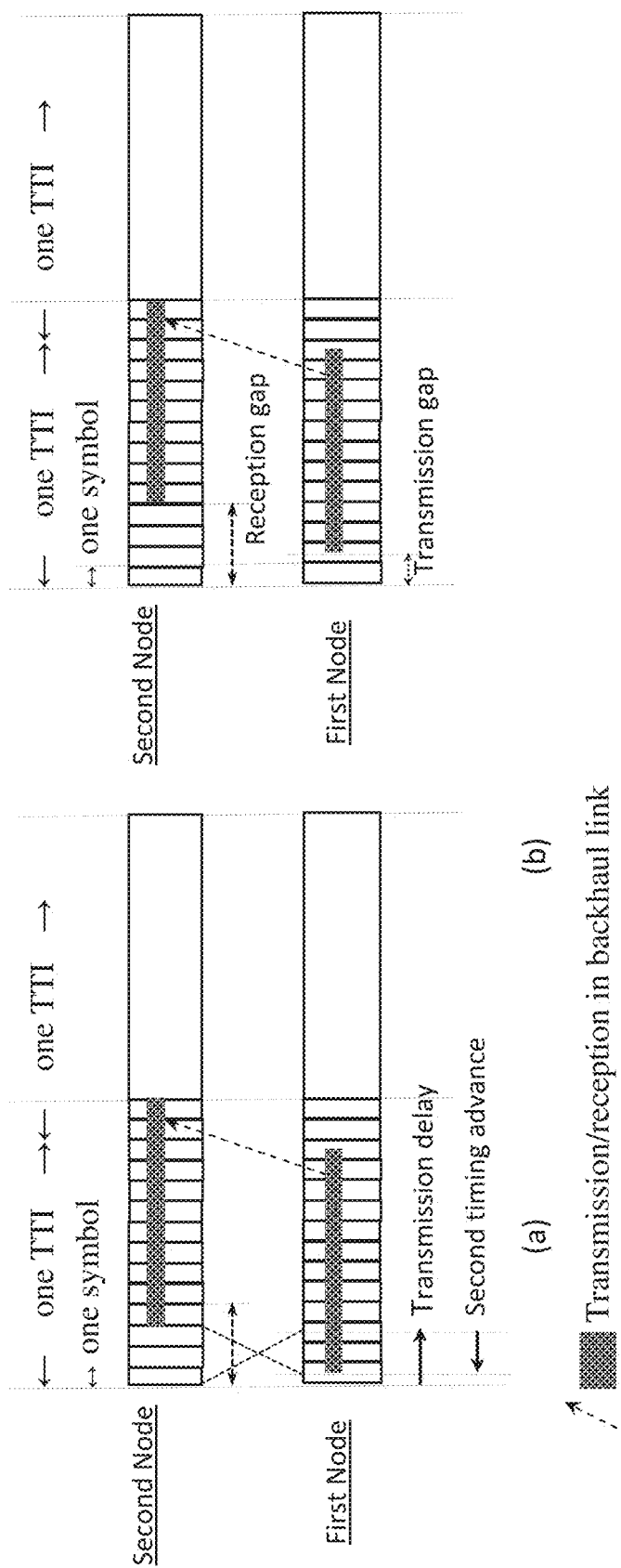
FIG. 24 is a flow chart according to one exemplary embodiment.

FIGS. 23(d) and (e) show an instance. If the time length of transmission delay is 2.6 symbol lengths, the second timing advance may be set to 2.6 symbol length. In one embodiment, the timing reduction reduces a value of the transmission delay to let a reception of the transmission by the second network node start within a CP (Cyclic Prefix) region. The second timing advance comprises at least one symbol and a factional symbol. For instance as shown in FIG. 24(a), if the time length of transmission delay is 2.6 symbol lengths, the second timing advance may be set to 2.2 (i.e. 2.6-0.4) symbol lengths. In one embodiment, the timing reduction could reduce the transmission delay value to let the second timing advance value as integer times of symbol length, or as integer times of both symbol length and CP length. The second timing advance value could be smaller than or equal to the transmission delay between the first network node and the second network node.

In one embodiment, the second timing advance value could be integer times of symbol length or of both symbol length and CP length. The symbol length and the CP length could mean the symbol length and the CP length in the second network node, or the symbol length the CP length in the first network node. The first network node could be a relay node or a relay TRP. The second network node could be an anchor node or donor gNB or a relay node or TRP. The second network node could also be a relay node or TRP with hop level higher than the first network node.

In second embodiment, for a first node served by a second network node, the first node could receive a signaling from the second network node to indicate a first timing advance. The first node could perform a first transmission to the second network node based on the first timing advance, wherein the first transmission is performed before the first node acts as a relay node. The first node could also perform a second transmission to the second network node based on a second timing advance, wherein the second transmission is performed after the first node acts as a relay node.

For a second network node serving a first node, the second network node could transmit a signaling to the first node to indicate a first timing advance. The second network node could receive a first transmission from the first node based on a first reception time, wherein the first transmission is performed before the first node acts as a relay node. The second network node could also receive a second transmission from the first node based on a second reception time, wherein the second transmission is performed after the first node acts as a relay node.

In one embodiment, the second timing advance could be indicated by the second network node. The second timing advance could be set to align the (starting) transmission timing of the second transmission to TTI (starting) boundary of a TTI with transmission direction set as downlink in the first node in TTI-level. The second timing advance could be set such that the time difference of the (starting) transmission timing of the second transmission and TTI (starting) boundary of a TTI with transmission direction set as downlink in the first node is integer times of TTI length.

In one embodiment, the second timing advance could be set to a half of the first timing advance. More specifically, the second timing advance could be set to a half of the first timing advance and timing advance adjustment value(s), wherein the first node receives the timing advance adjustment value(s) from the second network node. Alternatively, the second timing advance is set to a half of Round Trip Delay between the first node and second network node.

In one embodiment, the second timing advance could be set to transmission delay between the first node and the second network node. The transmission delay between the first node and the second network node could comprise the transmission or propagation delay from the first node to the second network node, or the transmission or propagation delay from the second network node to the first node. Alternatively, the transmission delay between the first node and the second network node could comprise the average of the transmission or propagation delay from the second network node to the first node and the transmission or propagation delay from the first node to the second network node. For instance, if the time length of transmission delay is 2.6 symbol lengths, the first timing advance may be set to 5.2 (i.e. 2×2.6) symbol lengths and the second timing advance may be set to 2.6 symbol lengths.

In one embodiment, the second timing advance could be set to the transmission delay between the first node and the second network node with a timing reduction. The second timing advance could also be set to a half of the first timing advance with a timing reduction. The timing reduction could induce reception of the second transmission by the second network node to start within CP region. The second timing advance could comprise at least one symbol and a factional symbol. For instance, if the time length of transmission delay is 2.6 symbol lengths or the first timing advance is set to 2.6 symbol lengths, the second timing advance may be set to 2.2 (i.e. 2.6-0.4) symbol lengths as shown in FIG. 24(a).

In one embodiment, the timing reduction could induce the second timing advance value as integer times of symbol length. The timing reduction could induce the second timing advance value as integer times of both symbol length and CP length. The second timing advance value could be smaller than or equal to the transmission delay between the first node and the second network node. The second timing advance value could also be smaller than or equal to the half of the first timing advance. Furthermore, the second timing advance value could be integer times of symbol length or of both symbol length and CP length. The symbol length and the CP length could mean the symbol length and the CP length in the second network node, or the symbol length and the CP length in the first node.

In one embodiment, the first reception time could be the TTI (starting) boundary in the second network node. The second reception time is with a reception gap to TTI (starting) boundary in the second network node. The reception gap could comprise at least one symbol, and could be set to a half of the first timing advance. More specifically, the reception gap could be set to the difference value of the first timing advance and the second timing advance, or to a half of the first timing advance with a timing addition.

In one embodiment, the timing addition could induce reception of the second transmission by the second network node to start within CP region, or the reception gap value as integer times of symbol length. In addition, the timing addition could induce the reception gap value as integer times of both symbol length and CP length. The reception gap value could be larger than or equal to the half of the first timing advance. The reception gap could be integer times of symbol length or of both symbol length and CP length. The symbol length and the CP length could mean the symbol length and the CP length in the second network node or the symbol length and the CP length in the first node.

Figure 25:
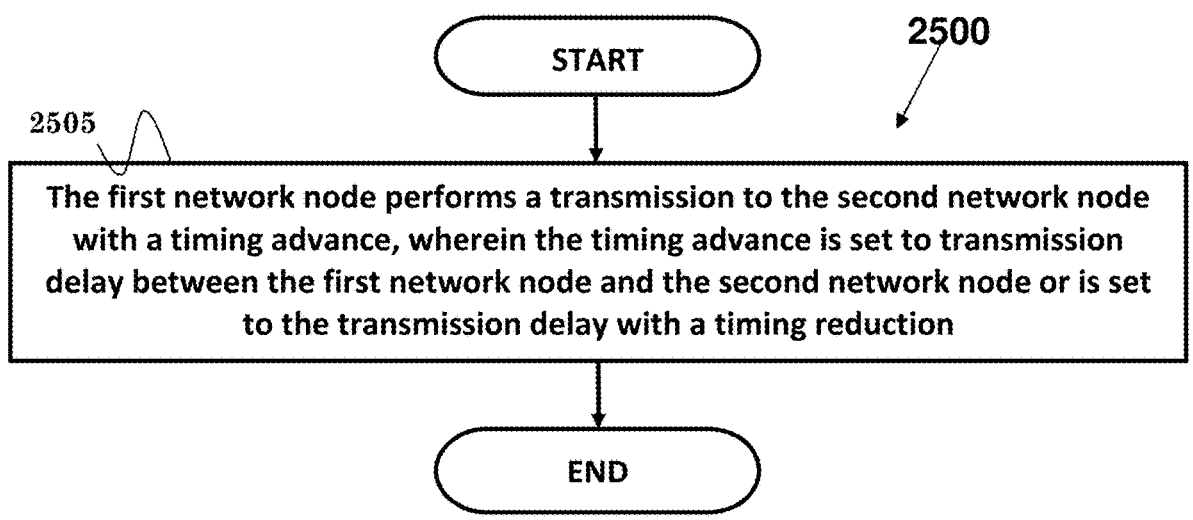
FIG. 25 is a flow chart according to one exemplary embodiment.

FIG. 23(a) shows an instance of the first transmission before the first node acts as a relay node. FIGS. 23(b) and (c) show an instance of the second transmission after the first node acts as a relay node. The second timing advance is set to the transmission delay or set to a half of the first timing advance. FIGS. 25 (d) and (e) show an instance of the second transmission after the first node acts as a relay node, wherein the second timing advance is set to transmission delay with a timing reduction or set to a half of the first timing advance with a timing reduction.

In one embodiment, the first node could perform the second transmission to the second network node in the symbol(s) or TTI(s) with transmission direction set to downlink in the first node. The first node could also perform the second transmission to the second network node in the symbol(s) or TTI(s) with transmission direction set to uplink in the first node. In addition, the first node could perform a first transmission to the second network node in the symbol(s) or TTI(s) with transmission direction set to uplink in the second network node. Furthermore, the first node could perform a first transmission to the second network node in the symbol(s) or TTI(s) with transmission direction set to downlink in the second network node.

In one embodiment, the second network node could receive the second transmission from the first node in the symbol(s) or TTI(s) with transmission direction set to uplink in the first node. Alternatively, the second network node could receive the second transmission from the first node in the symbol(s) or TTI(s) with transmission direction set to downlink in the first node. In one embodiment, the second network node could receive the first transmission from the first node in the symbol(s) or TTI(s) with transmission direction set to uplink in the second network node. Alternatively, the second network node could receive the first transmission from the first node in the symbol(s) or TTI(s) with transmission direction set to downlink in the second network node.

In one embodiment, the first node could be a relay node or a relay TRP. The second network node could be an anchor node or donor gNB or a relay node or TRP. The second network node could be a relay node or TRP with hop level higher than the first node.

In one embodiment, the first node could act as a relay node means that the first node could receive relay-related configuration, could receive and activate relay-related configuration, or could activate relay-related functionality. The relay-related configuration could be indicated or configured by the second network node. The relay-related configuration or functionality could comprise the scheduling or configuration of the second transmission in backhaul link, or the system information transmission from the first node. In one embodiment, before the first node acts as a relay node, the first node could act as a UE, and the first transmission could be in the access link.

In third embodiment, a first network node could perform a third transmission to the second network node in a TTI with transmission direction set as uplink in the first network node, and the first network node could perform a fourth transmission to the second network node in a TTI with transmission direction set as downlink in the first network node, wherein the TTI with transmission direction set as uplink in the first network node for the third transmission is TTI-level aligned to the TTI with transmission direction set as downlink in the first network node for the fourth transmission. The TTI with transmission direction set as uplink in the first network node could be TTI-level aligned to the TTI with transmission direction set as downlink in the first network node. No additional timing advance is applied for the TTI with transmission direction set as uplink for the third transmission, comparing to the TTI with transmission direction set as downlink for the fourth transmission to the second network node.

In one embodiment, starting transmission timing of the third transmission could be with same transmission gap to TTI (starting) boundary as starting transmission timing of the fourth transmission. The transmission gap could be zero or zero symbol. The timing gap could induce the reception of the third or fourth transmission by the second network node to start within CP region. The transmission gap could be shorter than one symbol. The timing gap could comprise a region for transmission in access link, and the transmission gap could comprise at least one symbol. The transmission gap could also comprise at least one symbol and a factional symbol. FIG. 24(b) shows an instance. The time length of transmission delay may be 2.6 symbol lengths. The first network node compensates the transmission delay to align the TTI boundary with the second network node. The time length of transmission gap can be set to 1.4 symbol lengths, such that the second network node can receive the third/fourth transmission starting from the fourth symbol.

Moreover, a first network node could receive a fifth transmission from a second network node in a TTI with transmission direction set as uplink in the first network node, and the first network node could receive a sixth transmission from a second network node in a TTI with transmission direction set as downlink in the first network node, wherein the TTI with transmission direction set as uplink in the first network node for receiving the fifth transmission is TTI-level aligned to the TTI with transmission direction set as downlink in the first network node for receiving the sixth transmission.

In one embodiment, the TTI with transmission direction set as uplink in the first network node could be TTI-level aligned to the TTI with transmission direction set as downlink in the first network node. No additional timing advance is applied for the TTI with transmission direction set as uplink for receiving the fifth transmission, comparing to the TTI with transmission direction set as downlink for receiving the sixth transmission. The starting reception timing of the fifth transmission could be with same reception gap to TTI (starting) boundary as starting reception timing of the sixth transmission. The reception gap could comprise at least one symbol. In one embodiment, the reception gap is set to a half of a first timing advance, wherein the first timing advance is indicated by the second network node. The reception gap value could be integer times of symbol length, or integer times of both symbol length and CP length. The reception gap value could be larger than or equal to the half of the first timing advance. The symbol length and the CP length could mean the symbol length and the CP length in the second network node or the symbol length and the CP length in the first network node.

In one embodiment, TTI-level alignment between the TTI with transmission direction set to uplink in the first network node and the TTI with transmission direction set to downlink in the first network node could mean that the TTI (starting) boundary time difference of the TTI with transmission direction set to uplink and the TTI with transmission direction set to downlink is integer times of TTI length. The backhaul link may be a link with no endpoint in a UE, a link between a relay node and an anchor node, a link between a relay node and another relay node, a link with one endpoint is a UE, a link between a UE and a relay node, or a link between a UE and an anchor node.

In one embodiment, the first network node could be a relay node, relay TRP, an anchor node, a donor gNB, a base station, or a network node. The second network node could be a relay node, a relay TRP, an anchor node, a donor gNB, a base station, or a network node.

For all embodiments above, TTI boundary of the TTI with transmission direction set to downlink in the first network node could be aligned to TTI boundary of the TTI with transmission direction set to downlink in the second network node. The TTI (starting) boundary of the TTI with transmission direction set to downlink in the first network node could be induced based on reception timing of a signal from the second network node and a third timing advance. The TTI boundary of the TTI with transmission direction set to uplink in the first network node could be aligned to TTI boundary of the TTI with transmission direction set to downlink in the second network node. The TTI (starting) boundary of the TTI with transmission direction set to uplink in the first network node could be induced based on reception timing of a signal from the second network node and a third timing advance. The signal could be a synchronization signal. The signal could be a CSI reference signal. The third timing advance could be a half of the first timing advance.

The transmission between the first network node and the second network node could be node-to-node transmission. The transmission between the first network node and the second network node could be transmitted in backhaul link.

A TTI could mean a slot, a mini-slot, a sub-slot, a subframe, or one time unit of transmission. A TTI could comprise multiple symbols. A TTI could comprise at least one symbol.

The transmission gap could be configured and could be indicated by signaling. The reception gap could be configured and could be indicated by signaling.

The first network node served by the second network node could mean that the first network node transmits or receives transmission to or from the second network node based on scheduling or configuration indicated by the second network node.

The hop level could mean the hop times between a relay node or a relay TRP and an anchor node or a donor gNB in backhaul link. A relay node or a relay TRP with higher hop level could mean the smaller or nearer hop times to anchor node or a donor gNB. A relay node or a relay TRP with lower hop level means the larger or further hop times to anchor node or a donor gNB.

FIG. 25 is a flow chart 2500 according to one exemplary embodiment from the perspective of a first network node served by a second network node. In step 2505, the first network node performs a transmission to the second network node with a timing advance, wherein the timing advance is set to transmission delay between the first network node and the second network node or is set to the transmission delay with a timing reduction.

In one embodiment, the timing reduction could reduce a value of the transmission delay to let a reception of the transmission by the second network node starts within a CP region. The transmission delay between the first network node and the second network node could mean a half of Round Trip Delay between the first network node and the second network node. The transmission delay could also mean a transmission or propagation delay from the first network node to the second network node, a transmission or propagation delay from the second network node to the first network node, an average of a transmission or propagation delay from the second network node to the first network node and a transmission or propagation delay from the first network node to the second network node.

In one embodiment, the first network node could be a relay node, and the second network node could be a donor node or a parent node of the first network node.

In one embodiment, the length of the transmission delay could comprise length of one or more than one full symbol(s) and a length of a factional symbol, and the length of timing reduction is the length of one full symbol minus the length of the factional symbol.

Referring back to FIGS. 3 and 4, in one exemplary embodiment of a first network node served by a second network node, the device 300 includes a program code 312 stored in the memory 310. The CPU 308 could execute program code 312 to enable the first network node to perform a transmission to the second network node with a timing advance, wherein the timing advance is set to transmission delay between the first network node and the second network node or is set to the transmission delay with a timing reduction. Furthermore, the CPU 308 can execute the program code 312 to perform all of the above-described actions and steps or others described herein.

Figure 26:
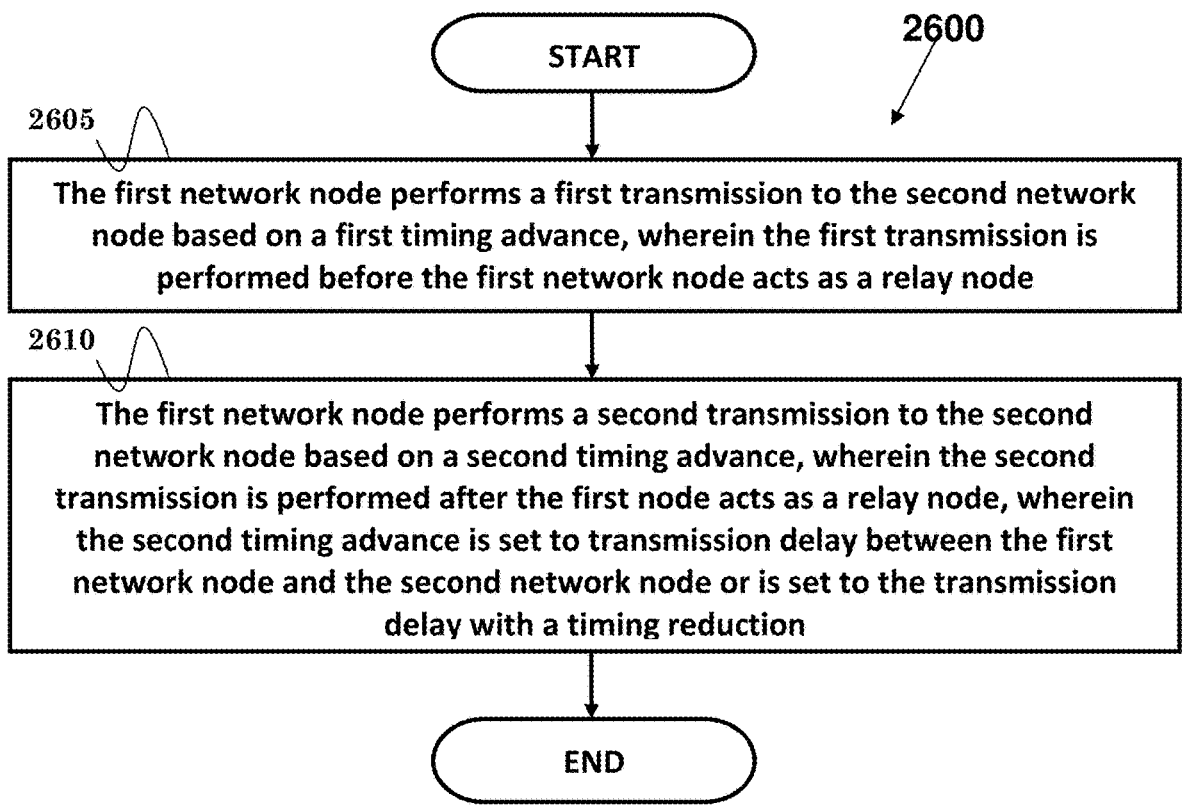
FIG. 26 is a flow chart according to one exemplary embodiment.

FIG. 26 is a flow chart 2600 according to one exemplary embodiment from the perspective of a first node served by a second network node. In step 2605, the first node performs a first transmission to the second network node based on a first timing advance, wherein the first transmission is performed before the first node acts as a relay node. In step 2610, the first node performs a second transmission to the second network node based on a second timing advance, wherein the second transmission is performed after the first node acts as the relay node, wherein the second timing advance is set to transmission delay between the first node and the second network node or is set to the transmission delay with a timing reduction.

In one embodiment, the transmission delay between the first node and the second network node could mean a half of the first timing advance. Alternatively, the transmission delay between the first node and the second network node could mean a half of Round Trip Delay between the first node and the second network node.

In one embodiment, the transmission delay could mean a transmission or propagation delay from the first node to the second network node, or a transmission or propagation delay from the second network node to the first node, or an average of the transmission or propagation delay from the second network node to the first node and the transmission or propagation delay from the first node to the second network node.

In one embodiment, the timing reduction could reduce a value of the transmission delay to let a reception of the transmission by the second network node start within CP region. The first node could be a relay node. The second network node could be a donor node or a parent node of the first node, e.g. when the first node acts as a relay node.

In one embodiment, the length of the transmission delay could comprise length of one or more than one full symbol(s) and a length of a factional symbol, and the length of timing reduction could be the length of one full symbol minus the length of the factional symbol. The first node acts as a relay node could mean that the first node receives and/or activates relay-related configuration or means that the first node activates relay-related functionality.

Referring back to FIGS. 3 and 4, in one exemplary embodiment of a first node served by a second network node, the device 300 includes a program code 312 stored in the memory 310. The CPU 308 could execute program code 312 to enable the first node (i) to perform a first transmission to the second network node based on a first timing advance, wherein the first transmission is performed before the first node acts as a relay node, and (ii) to perform a second transmission to the second network node based on a second timing advance, wherein the second transmission is performed after the first node acts as the relay node, wherein the second timing advance is set to transmission delay between the first node and the second network node or is set to the transmission delay with a timing reduction. Furthermore, the CPU 308 can execute the program code 312 to perform all of the above-described actions and steps or others described herein.

Figure 27:
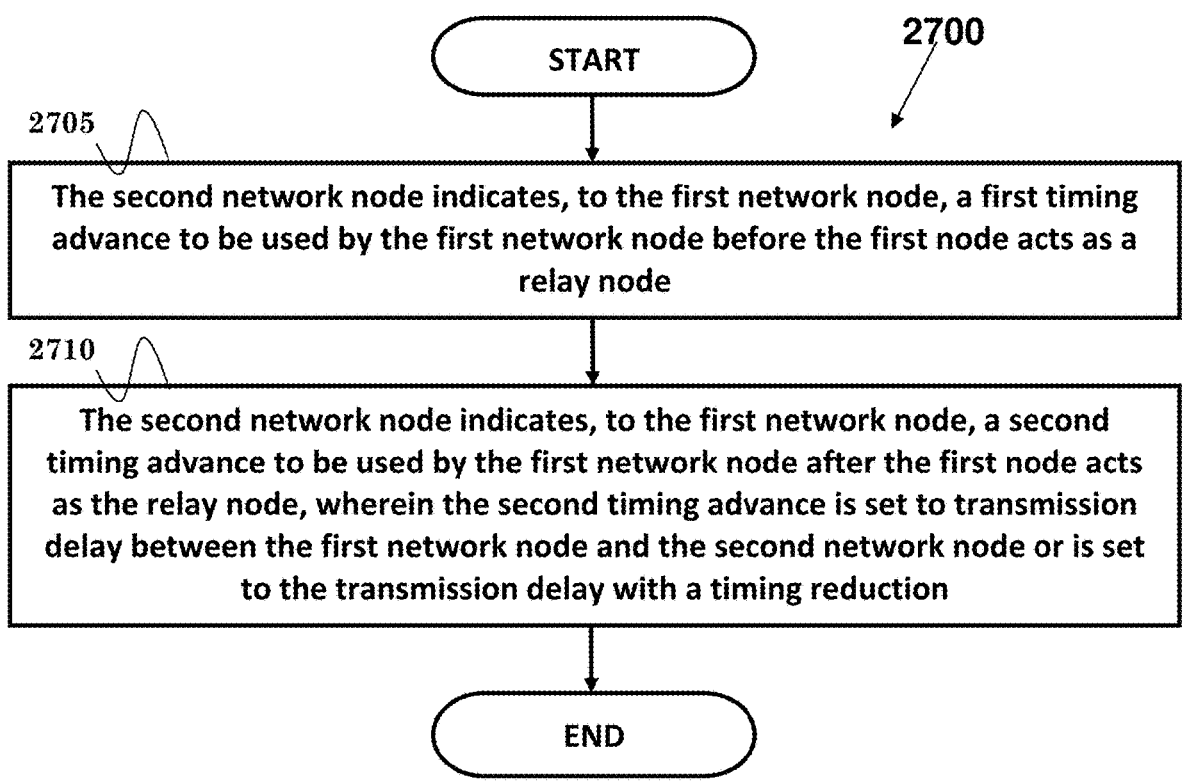
FIG. 27 is a flow chart according to one exemplary embodiment.

FIG. 27 is a flow chart 2700 according to one exemplary embodiment from the perspective of a second network node serving a first node. In step 2705, the second network node indicates, to the first node, a first timing advance to be used by the first node before the first node acts as a relay node. In step 2710, the second network node indicates, to the first node, a second timing advance to be used by the first node after the first node acts as the relay node, wherein the second timing advance is set to transmission delay between the first node and the second network node or is set to the transmission delay with a timing reduction.

In one embodiment, the transmission delay between the first node and the second network node could mean a half of the first timing advance. Alternatively, the transmission delay between the first node and the second network node could mean a half of Round Trip Delay between the first node and the second network node.

In one embodiment, the transmission delay could mean a transmission or propagation delay from the first node to the second network node, or a transmission or propagation delay from the second network node to the first node, or an average of the transmission or propagation delay from the second network node to the first node and the transmission or propagation delay from the first node to the second network node.

In one embodiment, the first node could be a relay node. The second network node could be a donor node or a parent node of the first node, e.g. when the first node acts as a relay node. The length of the transmission delay could comprise length of one or more than one full symbol(s) and a length of a factional symbol, and the length of timing reduction could be the length of one full symbol minus the length of the factional symbol.

Referring back to FIGS. 3 and 4, in one exemplary embodiment of a second network node serving a first node, the device 300 includes a program code 312 stored in the memory 310. The CPU 308 could execute program code 312 to enable the second network node (i) to indicate, to the first node, a first timing advance to be used by the first node before the first node acts as a relay node, and (ii) to indicate, to the first node, a second timing advance to be used by the first node after the first node acts as the relay node, wherein the second timing advance is set to transmission delay between the first node and the second network node or is set to the transmission delay with a timing reduction. Furthermore, the CPU 308 can execute the program code 312 to perform all of the above-described actions and steps or others described herein.

Figure 28:
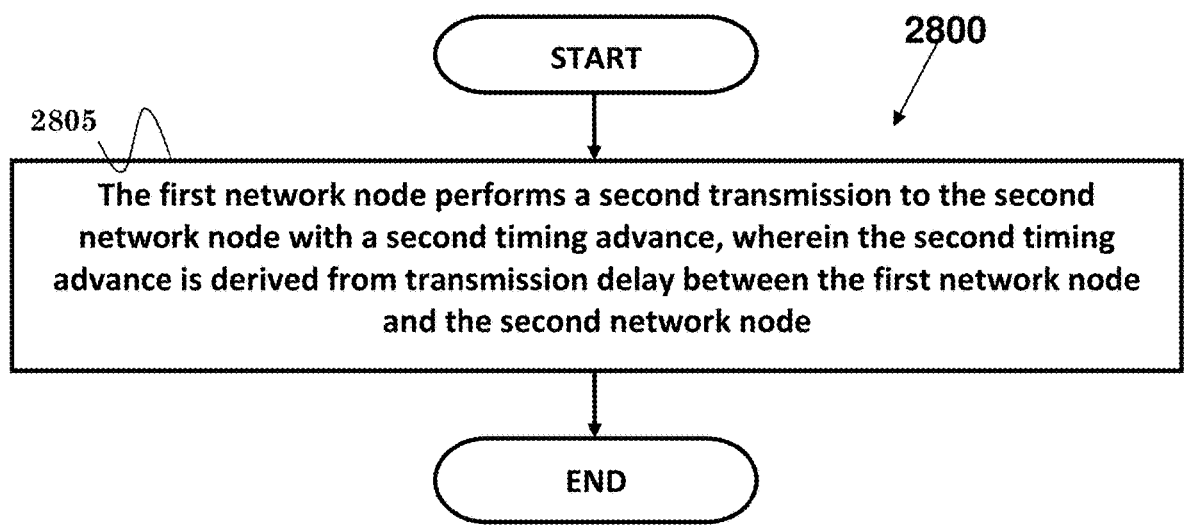
FIG. 28 is a flow chart according to one exemplary embodiment.

FIG. 28 is a flow chart 2800 according to one exemplary embodiment from the perspective of a first network node served by a second network node. In step 2805, the first network node performs a second transmission to the second network node with a second timing advance, wherein the second timing advance is derived from transmission delay between the first network node and the second network node.

In one embodiment, the transmission delay between the first network node and the second network node could comprise the transmission or propagation delay from the first network node to the second network node, the transmission or propagation delay from the second network node to the first network node, or the average of the transmission or propagation delay from the second network node to the first network node and the transmission or propagation delay from the first network node to the second network node.

In one embodiment, the second timing advance could be set to a half of Round Trip Delay between the first network node and second network node.

In one embodiment, the second timing advance could be set to the transmission delay between the first network node and the second network node with a timing reduction. The timing reduction could reduce a value of the transmission delay to let a reception of the transmission by the second network node start within CP region. The second timing advance could comprise at least one symbol and a factional symbol. Furthermore, the timing reduction could reduce the transmission delay value to let the second timing advance value as integer times of symbol length, or to let the second timing advance value as integer times of both symbol length and CP length.

In one embodiment, the second timing advance value could be smaller than or equal to the transmission delay between the first network node and the second network node. Alternatively, the second timing advance value could be integer times of symbol length or integer times of both symbol length and CP length.

In one embodiment, the symbol length and the CP length could mean the symbol length and the CP length in the second network node, or the symbol length and the CP length in the first network node. The first network node could be a relay node or a relay TRP. The second network node could be an anchor node or donor gNB or a relay node or TRP (with hop level higher than the first network node).

Referring back to FIGS. 3 and 4, in one exemplary embodiment of a first network node served by a second network node, the device 300 includes a program code 312 stored in the memory 310. The CPU 308 could execute program code 312 to enable the first network node to perform a second transmission to the second network node with a second timing advance, wherein the second timing advance is derived from transmission delay between the first network node and the second network node. Furthermore, the CPU 308 can execute the program code 312 to perform all of the above-described actions and steps or others described herein.

Figure 29:
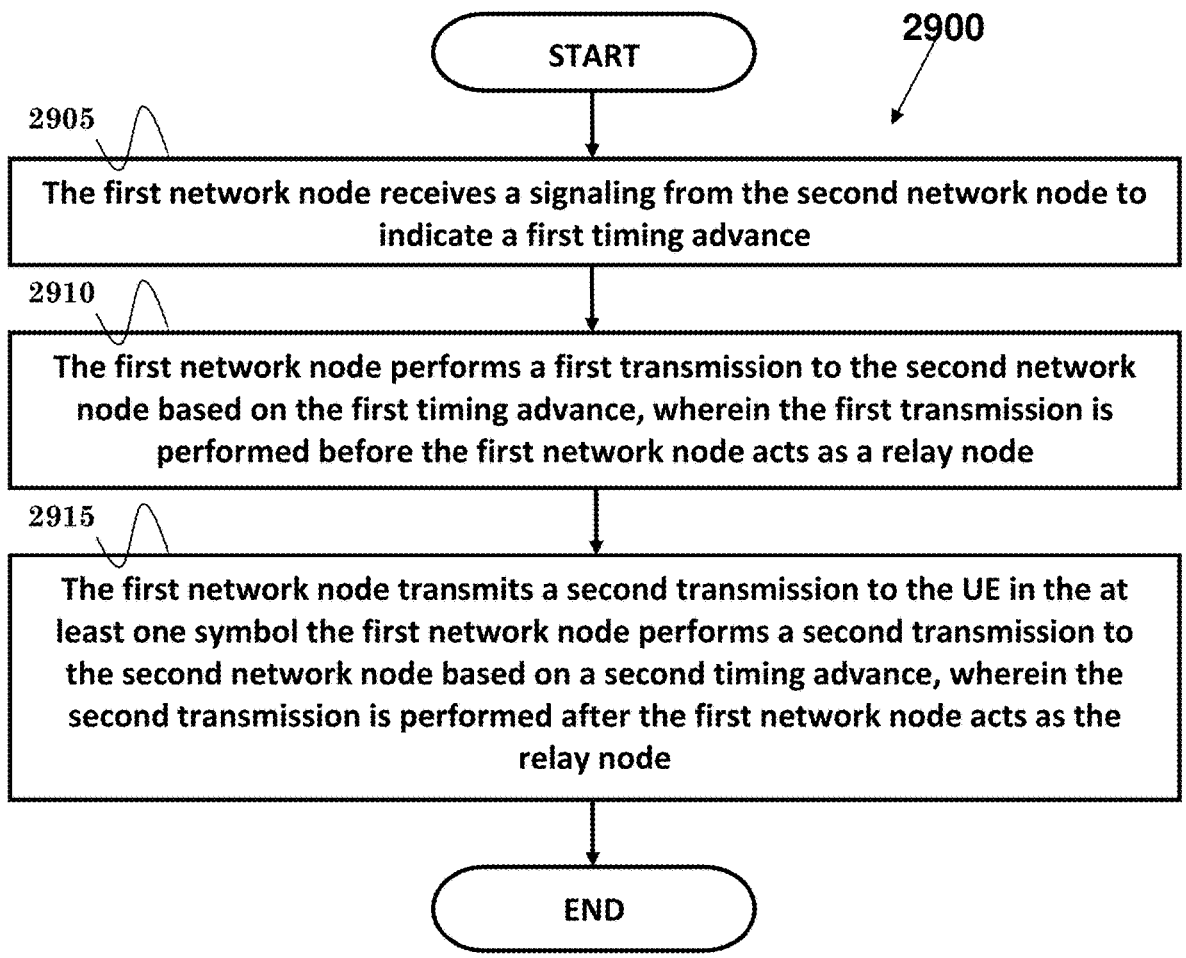
FIG. 29 is a flow chart according to one exemplary embodiment.

FIG. 29 is a flow chart 2900 according to one exemplary embodiment from the perspective of a first node served by a second network node. In step 2905, the first node receives a signaling from the second network node to indicate a first timing advance. In step 2910, the first node performs a first transmission to the second network node based on the first timing advance, wherein the first transmission is performed before the first node acts as a relay node. In step 2915, the first node performs a second transmission to the second network node based on a second timing advance, wherein the second transmission is performed after the first node acts as the relay node.

Referring back to FIGS. 3 and 4, in one exemplary embodiment of a first node served by a second network node, the device 300 includes a program code 312 stored in the memory 310. The CPU 308 could execute program code 312 to enable the first node (i) to receive a signaling from the second network node to indicate a first timing advance, (ii) to perform a first transmission to the second network node based on the first timing advance, wherein the first transmission is performed before the first node acts as a relay node, and (iii) to perform a second transmission to the second network node based on a second timing advance, wherein the second transmission is performed after the first node acts as the relay node. Furthermore, the CPU 308 can execute the program code 312 to perform all of the above-described actions and steps or others described herein.

Figure 30:
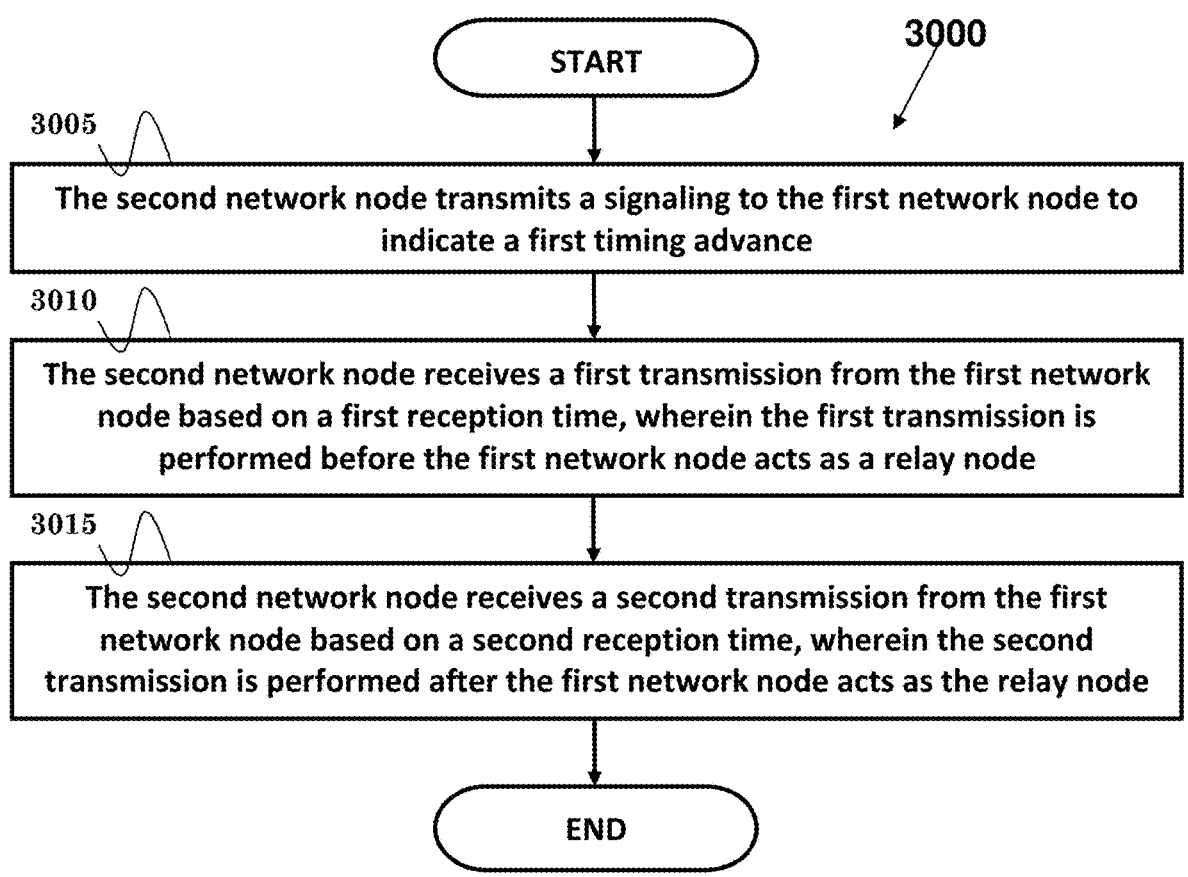
FIG. 30 is a flow chart according to one exemplary embodiment.

FIG. 30 is a flow chart 3000 according to one exemplary embodiment from the perspective of a second network node serving a first node. In step 3005, the second network node transmits a signaling to the first node to indicate a first timing advance. In step 3010, the second network node receives a first transmission from the first node based on a first reception time, wherein the first transmission is performed before the first node acts as a relay node. In step 3015, the second network node receives a second transmission from the first node based on a second reception time, wherein the second transmission is performed after the first node acts as the relay node.

Referring back to FIGS. 3 and 4, in one exemplary embodiment of a second network node serving a first node, the device 300 includes a program code 312 stored in the memory 310. The CPU 308 could execute program code 312 to enable the second network node (i) to transmit a signaling to the first node to indicate a first timing advance, (ii) to receive a first transmission from the first node based on a first reception time, wherein the first transmission is performed before the first node acts as a relay node, and (iii) to receive a second transmission from the first node based on a second reception time, wherein the second transmission is performed after the first node acts as the relay node. Furthermore, the CPU 308 can execute the program code 312 to perform all of the above-described actions and steps or others described herein.

In the context of the embodiments illustrated in FIGS. 29 and 30 and discussed above, in one embodiment, the second timing advance could be indicated by the second network node. The second timing advance could be set to align the (starting) transmission timing of the second transmission to TTI (starting) boundary of a TTI with transmission direction set as downlink in the first node in TTI-level. The second timing advance could be set such that the time difference of the (starting) transmission timing of the second transmission and TTI (starting) boundary of a TTI with transmission direction set as downlink in the first node is integer times of TTI length. The second timing advance could be set to a half of the first timing advance, to a half of the first timing advance and timing advance adjustment value(s), wherein the first node receives the timing advance adjustment value(s) from the second network node, or to a half of Round Trip Delay between the first node and second network node. Furthermore, the second timing advance could be set to transmission delay between the first node and the second network node.

In one embodiment, the transmission delay between the first node and the second network node could comprise the transmission or propagation delay from the first node to the second network node, the transmission or propagation delay from the second network node to the first node, or the average of the transmission or propagation delay from the second network node to the first node and the transmission or propagation delay from the first node to the second network node. The second timing advance could be set to the transmission delay between the first node and the second network node with a timing reduction, or to a half of the first timing advance with a timing reduction. The timing reduction could induce reception of the second transmission by the second network node to start within CP region.

In one embodiment, the second timing advance could comprise at least one symbol and a factional symbol. The timing reduction could induce the second timing advance value as integer times of symbol length, or integer times of both symbol length and CP length. The second timing advance value could be smaller than or equal to the transmission delay between the first node and the second network node, or smaller than or equal to the half of the first timing advance. The second timing advance value could also be integer times of symbol length or integer times of both symbol length and CP length. The symbol length and the CP length could mean the symbol length and the CP length in the second network node, or the symbol length and the CP length in the first node.

In one embodiment, the first reception time could be TTI (starting) boundary in the second network node. The second reception time could be with a reception gap to TTI (starting) boundary in the second network node. The reception gap could comprise at least one symbol. The reception gap could be set to a half of the first timing advance, to the difference value of the first timing advance and the second timing advance, or to a half of the first timing advance with a timing addition. The timing addition could induce reception of the second transmission by the second network node to start within CP region, the reception gap value as integer times of symbol length, or the reception gap value as integer times of both symbol length and CP length.

In one embodiment, the reception gap value could be larger than or equal to the half of the first timing advance. The reception gap value could be integer times of symbol length, or integer times of both symbol length and CP length. The symbol length and the CP length could mean the symbol length and the CP length in the second network node or the symbol length and/the CP length in the first node.

In one embodiment, the first node could perform a second transmission to the second network node in the symbol(s) or TTI(s) with transmission direction set to downlink in the first node. Alternatively, the first node could perform a second transmission to the second network node in the symbol(s) or TTI(s) with transmission direction set to uplink in the first node.

In one embodiment, the first node could perform a first transmission to the second network node in the symbol(s) or TTI(s) with transmission direction set to uplink in the second network node. Alternatively, the first node could perform a first transmission to the second network node in the symbol(s) or TTI(s) with transmission direction set to downlink in the second network node.

In one embodiment, the second network node could receive the second transmission from the first node in the symbol(s) or TTI(s) with transmission direction set to uplink in the first node. Alternatively, the second network node could receive the second transmission from the first node in the symbol(s) or TTI(s) with transmission direction set to downlink in the first node.

In one embodiment, the second network node could receive the first transmission from the first node in the symbol(s) or TTI(s) with transmission direction set to uplink in the second network node. Alternatively, the second network node could receive the first transmission from the first node in the symbol(s) or TTI(s) with transmission direction set to downlink in the second network node.

In one embodiment, the first node could be a relay node or a relay TRP, and the second network node could be an anchor node or donor gNB or a relay node or TRP (with hop level higher than the first node). The first node acts as a relay node could mean that the first node receives relay-related configuration, that the first node receives and activate relay-related configuration, or that the first node activates relay-related functionality. The relay-related configuration could be indicated or configured by the second network node. The relay-related configuration or functionality could comprise the scheduling or configuration of the second transmission in backhaul link, or the system information transmission from the first node.

In one embodiment, before the first node acts as a relay node, the first node could act as a UE, and the first transmission could be in the access link.

Figure 31:
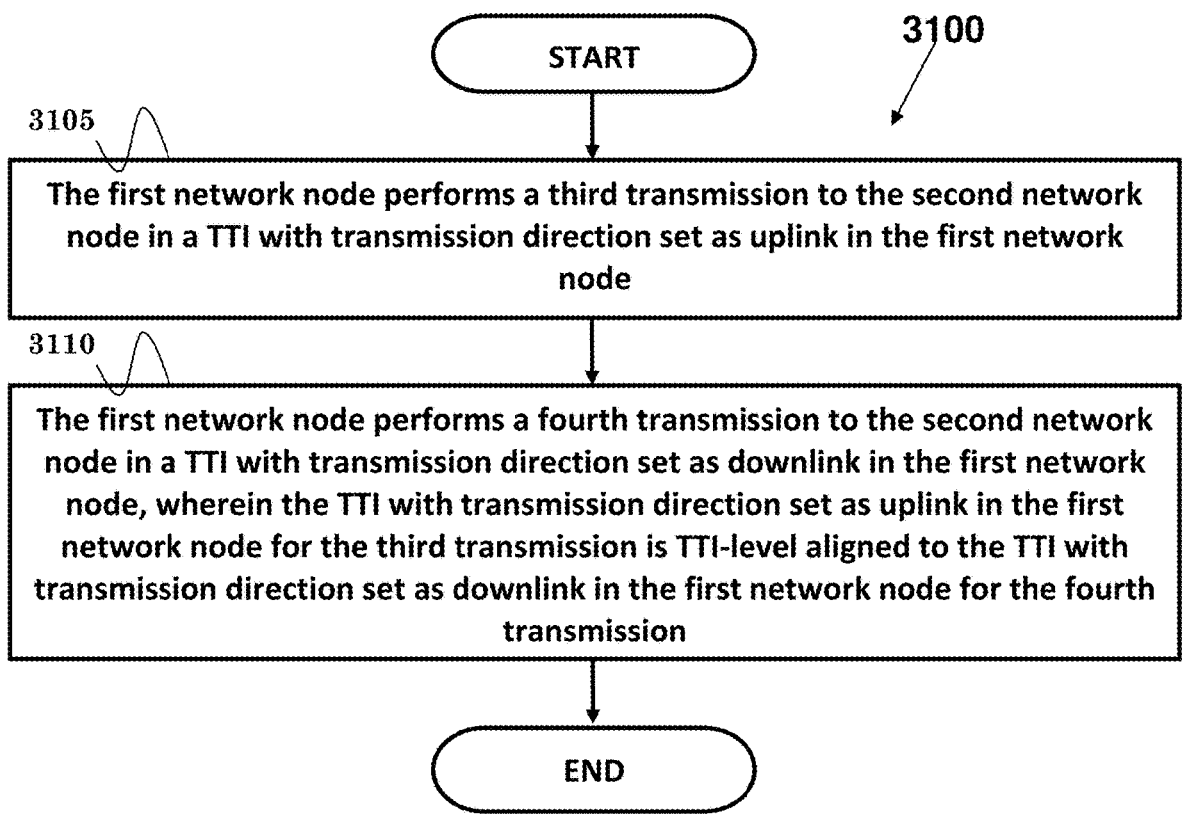
FIG. 31 is a flow chart according to one exemplary embodiment.

FIG. 31 is a flow chart 3100 according to one exemplary embodiment from the perspective of a first network node. In step 3105, the first network node performs a third transmission to the second network node in a TTI with transmission direction set as uplink in the first network node. In step 3110, the first network node performs a fourth transmission to the second network node in a TTI with transmission direction set as downlink in the first network node, wherein the TTI with transmission direction set as uplink in the first network node for the third transmission is TTI-level aligned to the TTI with transmission direction set as downlink in the first network node for the fourth transmission.

In one embodiment, the TTI with transmission direction set as uplink in the first network node could be TTI-level aligned to the TTI with transmission direction set as downlink in the first network node. No additional timing advance is applied for the TTI with transmission direction set as uplink for the third transmission, comparing to the TTI with transmission direction set as downlink for the fourth transmission to the second network node. The starting transmission timing of the third transmission could be with same transmission gap to TTI (starting) boundary as starting transmission timing of the fourth transmission.

In one embodiment, the transmission gap could be zero or zero symbol. The timing gap could induce that reception of the third or fourth transmission by the second network node start within CP region. The transmission gap could be shorter than one symbol. The timing gap could comprise a region for transmission in access link. The transmission gap could comprise at least one symbol or at least one symbol and a factional symbol.

Referring back to FIGS. 3 and 4, in one exemplary embodiment of a first network node, the device 300 includes a program code 312 stored in the memory 310. The CPU 308 could execute program code 312 to enable the first network node (i) to perform a third transmission to the second network node in a TTI with transmission direction set as uplink in the first network node, and (ii) to perform a fourth transmission to the second network node in a TTI with transmission direction set as downlink in the first network node, wherein the TTI with transmission direction set as uplink in the first network node for the third transmission is TTI-level aligned to the TTI with transmission direction set as downlink in the first network node for the fourth transmission. Furthermore, the CPU 308 can execute the program code 312 to perform all of the above-described actions and steps or others described herein.

Figure 32:
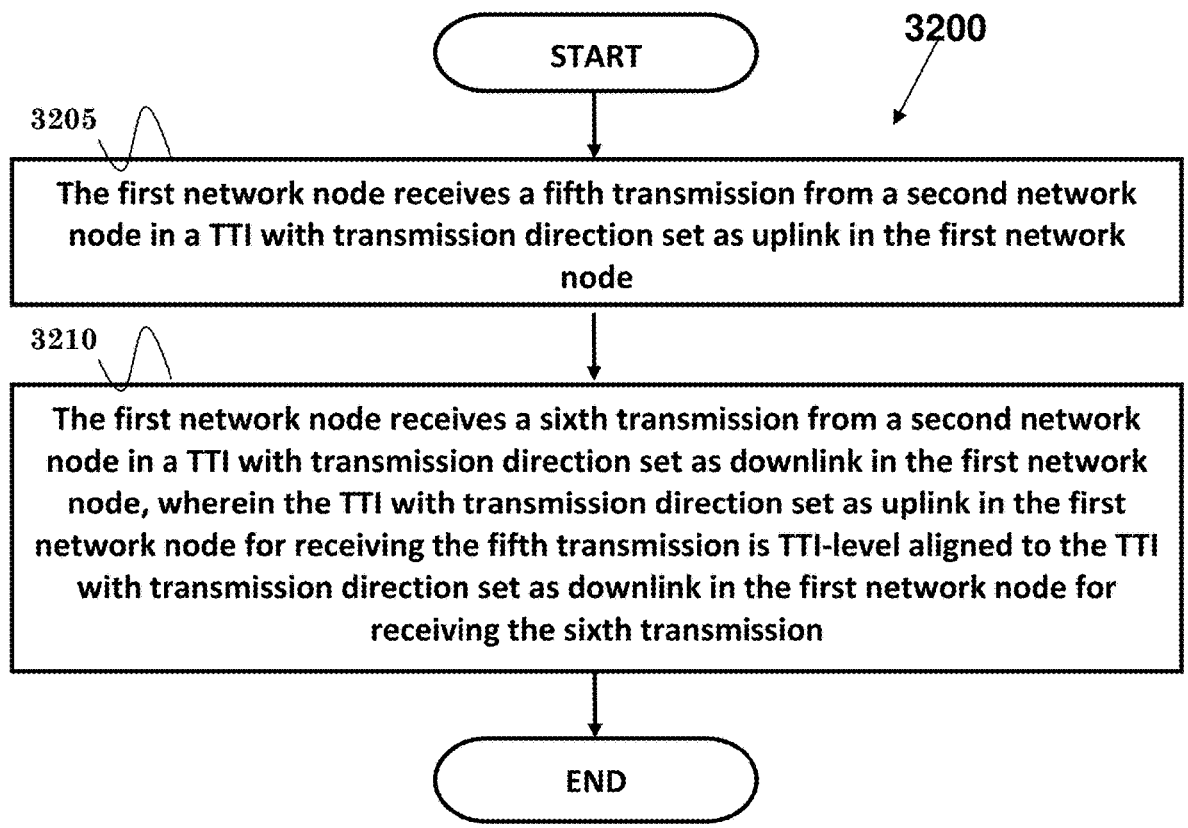
FIG. 32 is a flow chart according to one exemplary embodiment.

FIG. 32 is a flow chart 3200 according to one exemplary embodiment from the perspective of a first network node. In step 3205, the first network node receives a fifth transmission from a second network node in a TTI with transmission direction set as uplink in the first network node. In step 3210, the first network node receives a sixth transmission from a second network node in a TTI with transmission direction set as downlink in the first network node, wherein the TTI with transmission direction set as uplink in the first network node for receiving the fifth transmission is TTI-level aligned to the TTI with transmission direction set as downlink in the first network node for receiving the sixth transmission.

In one embodiment, the TTI with transmission direction set as uplink in the first network node could be TTI-level aligned to the TTI with transmission direction set as downlink in the first network node. No additional timing advance is applied for the TTI with transmission direction set as uplink for receiving the fifth transmission, comparing to the TTI with transmission direction set as downlink for receiving the sixth transmission. Starting reception timing of the fifth transmission could be with same reception gap to TTI (starting) boundary as starting reception timing of the sixth transmission.

In one embodiment, the reception gap could comprise at least one symbol. The reception gap could be set to a half of a first timing advance, wherein the first timing advance is indicated by the second network node. The reception gap value could be integer times of symbol length or integer times of both symbol length and CP length. The reception gap value could be larger than or equal to the half of the first timing advance. The symbol length and the CP length could mean the symbol length and the CP length in the second network node or the symbol length and the CP length in the first network node.

Referring back to FIGS. 3 and 4, in one exemplary embodiment of a first network node, the device 300 includes a program code 312 stored in the memory 310. The CPU 308 could execute program code 312 to enable the first network node (i) to receive a fifth transmission from a second network node in a TTI with transmission direction set as uplink in the first network node, and (ii) to receive a sixth transmission from a second network node in a TTI with transmission direction set as downlink in the first network node, wherein the TTI with transmission direction set as uplink in the first network node for receiving the fifth transmission is TTI-level aligned to the TTI with transmission direction set as downlink in the first network node for receiving the sixth transmission. Furthermore, the CPU 308 can execute the program code 312 to perform all of the above-described actions and steps or others described herein.

In the context of the embodiments shown in FIGS. 31-32 and discussed above, in one embodiment, the first network node could be a relay node, a relay TRP, an anchor node, a donor gNB, or a network node. The second network node could be a relay node, a relay TRP, an anchor node, a donor gNB, or a network node.

In the context of the embodiments shown in FIGS. 28-32 and discussed above, in one embodiment, TTI-level alignment between the TTI with transmission direction set to uplink in the first network node and the TTI with transmission direction set to downlink in the first network node could mean that the TTI (starting) boundary time difference of the TTI with transmission direction set to uplink and the TTI with transmission direction set to downlink is integer times of TTI length. TTI boundary of the TTI with transmission direction set to downlink in the first network node could be aligned to TTI boundary of the TTI with transmission direction set to downlink in the second network node. TTI (starting) boundary of the TTI with transmission direction set to downlink in the first network node could be induced based on reception timing of a signal from the second network node and a third timing advance. TTI boundary of the TTI with transmission direction set to uplink in the first network node could be aligned to TTI boundary of the TTI with transmission direction set to downlink in the second network node. TTI (starting) boundary of the TTI with transmission direction set to uplink in the first network node could be induced based on reception timing of a signal from the second network node and a third timing advance.

In one embodiment, the signal could be synchronization signal or CSI reference signal. The third timing advance could be a half of the first timing advance. The transmission between the first network node and the second network node could be node-to-node transmission, or could be transmitted in backhaul link.

In one embodiment, a TTI could mean a slot, a mini-slot, a sub-slot, a subframe, or one time unit of transmission. A TTI could comprise multiple symbols or at least one symbol.

In one embodiment, the transmission gap could be configured or could be indicated by signaling. The reception gap could be configured or could be indicated by signaling.

In one embodiment, the first network node served by the second network node could mean that the first network node transmits or receives transmission to or from the second network node based on scheduling or configuration indicated by the second network node.

In one embodiment, the hop level could mean the hop times between a relay node or a relay TRP and an anchor node or a donor gNB in backhaul link. A relay node or a relay TRP with higher hop level could mean the smaller or nearer hop times to anchor node or a donor gNB. A relay node or a relay TRP with lower hop level could mean the larger or further hop times to anchor node or a donor gNB.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a first network node served by a second network node in a wireless communication system, comprising:
   the first network node performs a transmission to the second network node by advancing transmission timing of the transmission based on a second timing advance,
   wherein the first network node is a relay node to serve at least one UE (user equipment), and the second network node is a donor node or a parent node of the first network node,
   wherein a value of the second timing advance is derived from a value of a half of a Round Trip Delay minus a value of a timing reduction,
   wherein the value of the timing reduction is non-zero, and
   wherein the value of the second timing advance is smaller than the value of the half of the Round Trip Delay, wherein the half of the Round Trip Delay is between the first network node and the second network node.

2. The method of claim 1, wherein:
   the half of Round Trip Delay between the first network node and the second network node comprises a transmission delay between the first network node and the second network node; and
   the transmission delay comprises an average of (i) a transmission or propagation delay from the second network node to the first network node and (ii) a transmission or propagation delay from the first network node to the second network node.

3. The method of claim 1, wherein:
   the half of RoundTrip Delay between the first network node and the second network node comprises a transmission delay between the first network node and the second network node; and
   the transmission delay comprises at least one of a transmission or propagation delay from the first network node to the second network node, or a transmission or propagation delay from the second network node to the first network node.

4. The method of claim 1, wherein at least one of:
   a length of the timing reduction is less than a length of one full symbol; or
   a length of the half of Round Trip Delay comprises a length of one or more than one full symbol(s) and a length of a fractional symbol, and the length of the timing reduction is a length of one full symbol minus the length of the fractional symbol.

5. The method of claim 1, wherein the first network node receives a signaling, from the second network node, to indicate a timing advance information for determining a first timing advance, and wherein the first timing advance comprises the Round Trip Delay.

6. The method of claim 1, wherein at least one of:
   the second timing advance induces reception of the transmission by the second network node with a reception gap to TTI (Transmission Time Interval) boundary in the second network node; or
   the reception gap is a value of the half of the Round Trip Delay plus a value of timing reduction.

7. The method of claim 6, wherein the timing reduction induces the reception gap as integer times of both a symbol length and a CP (Cyclic Prefix) length.

8. The method of claim 1, wherein the timing reduction reduces a value of the half of Round Trip Delay to induce a reception of the transmission by the second network node start within a CP (Cyclic Prefix) region.

9. The method of claim 1, wherein the transmission timing of the transmission is advanced based on reception timing from the second network node to the first network node.

10. A method for a first network node served by a second network node in a wireless communication system, comprising:
the first network node performs a first transmission to the second network node by advancing transmission timing of the first transmission based on a first timing advance, wherein the first transmission is performed before the first network node acts as a relay node; and
the first network node performs a second transmission to the second network node by advancing transmission timing of the second transmission based on a second timing advance,
wherein the second transmission is performed after the first network node acts as the relay node,
wherein the second network node is a donor node or a parent node of the first network node when the first network node acts as the relay node,
wherein a value of the second timing advance is derived from a value of a half of the first timing advance minus a value of a timing reduction,
wherein a value of the timing reduction is non-zero, and
wherein the value of the second timing advance is smaller than the value of the half of the first timing advance.

11. The method of claim 10, wherein the half of the first timing advance comprises a transmission delay between the first network node and the second network node.

12. The method of claim 11, wherein the transmission delay comprises at least one of a transmission or propagation delay from the first network node to the second network node, or a transmission or propagation delay from the second network node to the first network node, or an average of (i) the transmission or propagation delay from the second network node to the first network node and (ii) the transmission or propagation delay from the first network node to the second network node.

13. The method of claim 10, wherein the half of the first timing advance comprises a half of Round Trip Delay between the first network node and the second network node.

14. The method of claim 10, wherein the first timing advance is determined based on a timing advance information indicated by the second network node.

15. The method of claim 10, wherein at least one of:
a length of the timing reduction is less than a length of one full symbol; or
a length of the half of the first timing advance comprises a length of one or more than one full symbol(s) and a length of a fractional symbol, and the length of the timing reduction is a length of one full symbol minus the length of the fractional symbol.

16. The method of claim 10, wherein the first network node acting as the relay node comprises at least one of:
the first network node receives or activates relay-related configuration;
the first network node activates relay-related functionality; or
the first network node acts as the relay node to serve at least one UE.

17. The method of claim 10, wherein at least one of:
the first timing advance induces reception of the first transmission by the second network node to align to TTI (Transmission Time Interval) boundary in the second network node;
the second timing advance induces reception of the second transmission by the second network node with a reception gap to TTI boundary in the second network node; or
the reception gap is a value of the half of the first timing advance plus a value of the timing reduction.

18. The method of claim 10, wherein the timing reduction reduces a value of the half of the first timing advance to induce a reception of the second transmission by the second network node starts within a CP (Cyclic Prefix) region.

19. The method of claim 10,
wherein the transmission timing of the first transmission is advanced based on reception timing from the second network node to the first network node, or
wherein the transmission timing of the second transmission is advanced based on reception timing from the second network node to the first network node.

20. A method for a second network node serving a first network node in a wireless communication system, comprising:
the second network node indicates, to the first network node, a first timing advance to be used by the first network node before the first network node acts as a relay node; and
the second network node indicates, to the first network node, a second timing advance to be used by the first network node after the first network node acts as the relay node,
wherein the second network node is a donor node or a parent node of the first network node when the first network node acts as the relay node,
wherein a value of the second timing advance is derived from a value of a half of the first timing advance minus a value of a timing reduction,
wherein a value of the timing reduction is non-zero, and
wherein the value of the second timing advance is smaller than the value of the half of the first timing advance,
wherein the half of the first timing advance is between the first network node and the second network node.

21. The method of claim 20, wherein the half of the first timing advance comprises a transmission delay between the first network node and the second network node.

22. The method of claim 21, wherein the transmission delay comprises a transmission or propagation delay from the first network node to the second network node, or a transmission or propagation delay from the second network node to the first network node, or an average of (i) the transmission or propagation delay from the second network node to the first network node and (ii) the transmission or propagation delay from the first network node to the second network node.

23. The method of claim 20, wherein the half of the first timing advance comprises a half of Round Trip Delay between the first network node and the second network node.

24. The method of claim 20, wherein at least one of:
a length of the timing reduction is less than a length of one full symbol; or
a length of the half of the first timing advance comprises a length of one or more than one full symbol(s) and a length of a fractional symbol, and the length of the timing reduction is a length of one full symbol minus the length of the fractional symbol.

25. The method of claim 20, wherein the first network node acting as the relay node comprises at least one of:
the first network node receives or activates relay-related configuration;
the first network node activates relay-related functionality; or
the first network node acts as the relay node to serve at least one UE.

26. The method of claim 20, wherein at least one of:
the first timing advance induces reception of a first transmission, from the first network node to the second network node, to align to TTI (Transmission Time Interval) boundary in the second network node;
the second timing advance induces reception of a second transmission, from the first network node to the second network node, with a reception gap to TTI boundary in the second network node; or
the reception gap is a value of the half of the first timing advance plus a value of the timing reduction.

27. The method of claim 20, wherein the timing reduction reduces a value of the half of the first timing advance to induce a reception of a transmission from the first network node to the second network node starts within a CP (Cyclic Prefix) region.

28. The method of claim 20,
wherein the first timing advance is utilized for advancing transmission timing of a first transmission, from the first network node to the second network node, based on reception timing from the second network node to the first network node, or
wherein the second timing advance is utilized for advancing transmission timing of a second transmission, from the first network node to the second network node, based on reception timing from the second network node to the first network node.

* * * * *